United States Patent
Dean et al.

(10) Patent No.: US 10,317,095 B2
(45) Date of Patent: Jun. 11, 2019

(54) COUNTER-FLOW ENERGY RECOVERY VENTILATOR (ERV) CORE

(71) Applicant: CORE Energy Recovery Solutions Inc., Vancouver OT (CA)

(72) Inventors: James Franklin Dean, West Vancouver (CA); David Erwin Kadylak, Surrey (CA); Ryan Nicholas Huizing, Vancouver (CA); Jordan Benda Balanko, West Vancouver (CA); Curtis Warren Mullen, Vancouver (CA)

(73) Assignee: CORE Energy Recovery Solutions Inc., Vancouver (CA)

( * ) Notice: Subject to any disclaimer, the term of this patent is extended or adjusted under 35 U.S.C. 154(b) by 226 days.

(21) Appl. No.: 15/184,757

(22) Filed: Jun. 16, 2016

(65) Prior Publication Data
US 2016/0290664 A1    Oct. 6, 2016

Related U.S. Application Data

(63) Continuation of application No. 14/360,245, filed as application No. PCT/CA2012/050918 on Dec. 19, 2012, now abandoned.
(Continued)

(30) Foreign Application Priority Data

Jun. 7, 2012    (WO) ................ PCT/CA2012/000560

(51) Int. Cl.
*F24F 3/147*    (2006.01)
*F28D 9/00*    (2006.01)
(Continued)

(52) U.S. Cl.
CPC ............ *F24F 3/147* (2013.01); *F28D 9/0025* (2013.01); *F28D 9/0037* (2013.01);
(Continued)

(58) Field of Classification Search
CPC .... F28D 9/0081; F28D 9/0037; F28D 9/0031; B23P 15/26; Y10T 29/49357
See application file for complete search history.

(56) References Cited

U.S. PATENT DOCUMENTS 2,812,165 A    11/1957    Hammond
3,847,211 A *  11/1974    Fischel .................. B01D 53/22
                                               165/166
(Continued)

FOREIGN PATENT DOCUMENTS

DE    3111360 A1    10/1982
EP    2131133 A1    12/2009
(Continued)

OTHER PUBLICATIONS

Koester, S. et al., "Process Intensification by Novel Enthalpy Aixchangers", 8th ECCE, Berlin, Sep. 26-29, 2011.

*Primary Examiner* — Jason L Vaughan
*Assistant Examiner* — Amanda Kreiling
(74) *Attorney, Agent, or Firm* — Oyen Wiggs Green & Mutala LLP

(57) ABSTRACT

A heat and humidity exchanger has example application in exchanging heat and water vapor between fresh air entering a building and air being vented from the building. The heat and humidity exchanger has a self-supporting core formed from layered sheets of a moisture-permeable material. Plenums are arranged to direct fluid streams into and out of the core. The plenums may be on opposing sides of the core to permit counterflow exchange of heat and water vapor.

5 Claims, 22 Drawing Sheets

Related U.S. Application Data

(60) Provisional application No. 61/577,209, filed on Dec. 19, 2011.

(51) Int. Cl.

| | | |
|---|---|---|
| *F28D 21/00* | (2006.01) | |
| *F28F 9/02* | (2006.01) | |
| *F28F 9/26* | (2006.01) | |
| *F24F 3/14* | (2006.01) | |
| *F24F 12/00* | (2006.01) | |
| *F24F 11/46* | (2018.01) | |

(52) U.S. Cl.
CPC ........ *F28D 21/0015* (2013.01); *F28F 9/0268* (2013.01); *F28F 9/26* (2013.01); *F24F 11/46* (2018.01); *F24F 2003/1435* (2013.01); *F24F 2012/008* (2013.01); *F28F 2275/025* (2013.01); *Y02B 30/563* (2013.01)

(56) References Cited

U.S. PATENT DOCUMENTS

| | | | |
|---|---|---|---|
| 4,040,804 A | 8/1977 | Harrison | |
| 4,609,039 A | 9/1986 | Fushiki et al. | |
| 5,279,361 A | 1/1994 | Cohen | |
| 5,725,051 A | 3/1998 | Veltkamp | |
| 6,032,730 A | 3/2000 | Akita et al. | |
| 6,145,588 A | 11/2000 | Martin et al. | |
| 6,361,588 B1 | 3/2002 | Moratalla | |
| 6,536,514 B1 | 3/2003 | Sugiyama et al. | |
| 6,978,635 B2 | 12/2005 | Yabu et al. | |
| 7,331,376 B2 | 2/2008 | Gagnon et al. | |
| 7,585,355 B2 | 9/2009 | Gongo et al. | |
| 7,717,404 B2 | 5/2010 | Hasegawa et al. | |
| 8,157,891 B2 | 4/2012 | Montie et al. | |
| 2005/0082051 A1 | 4/2005 | Hashimoto et al. | |
| 2005/0121181 A1 | 6/2005 | Szulman et al. | |
| 2008/0085437 A1 | 4/2008 | Dean et al. | |
| 2009/0071638 A1* | 3/2009 | Murayama | F24F 3/147 165/166 |
| 2009/0314480 A1 | 12/2009 | Grinbergs et al. | |
| 2010/0175859 A1 | 7/2010 | Takada et al. | |
| 2011/0192579 A1 | 8/2011 | Sotokawa et al. | |

FOREIGN PATENT DOCUMENTS

| | | |
|---|---|---|
| GB | 2170586 A | 8/1986 |
| JP | 10-089879 A | 4/1998 |
| JP | 11-108580 A | 4/1999 |
| WO | 2010132983 A1 | 11/2010 |
| WO | 2012167366 A1 | 12/2012 |

* cited by examiner

COUNTER-FLOW ENERGY RECOVERY VENTILATOR (ERV) CORE

CROSS-REFERENCE TO RELATED APPLICATIONS

This application is a continuation of U.S. application Ser. No. 14/360,245 filed 22 May 2014 entitled COUNTER-FLOW ENERGY RECOVERY VENTILATOR (ERV) CORE, which is a 371 of PCT International Application No. PCT/CA2012/050918 filed 19 Dec. 2012 entitled COUNTER-FLOW ENERGY RECOVERY VENTILATOR (ERV) CORE, which claims the benefit under 35 U.S.C. § 119 of U.S. Application No. 61/577,209 filed 19 Dec. 2011 entitled COUNTER-FLOW ENERGY RECOVERY VENTILATOR (ERV) CORE. PCT International Application No. PCT/CA2012/050918 also claims priority from PCT International Application No. PCT/CA2012/000560 filed 7 Jun. 2012 entitled SELECTIVE WATER VAPOUR TRANSPORT MEMBRANES COMPRISING A NANOFIBROUS LAYER AND METHODS FOR MAKING THE SAME. All of these applications are hereby incorporated herein by reference for all purposes.

FIELD OF THE INVENTION

The present invention relates to heat and humidity exchangers. Example embodiments provide energy recovery ventilator (ERV) cores comprising a water-permeable membranes and ERV systems that include such cores. The invention may be applied in any of a wide variety of applications where heat and humidity exchange is required. Examples include heat and moisture recovery in building ventilation systems, humidification and heat transfer in fuel cells, separation of gases, and desalination treatment of water.

BACKGROUND

Heat and humidity exchangers (also sometimes referred to as humidifiers) have been developed for a variety of applications, including building ventilation (HVAC), medical and respiratory applications, gas drying, and more recently for the humidification of fuel cell reactants for electrical power generation. Many such devices involve the use of a water-permeable membrane across which heat and moisture may be transferred between fluid streams flowing on opposite sides of the membrane.

Planar plate-type heat and humidity exchangers use membrane plates that are constructed of planar, water-permeable membranes (for example, Nafion®, cellulose, polymers or other synthetic membranes) supported with a spacer and/or frame. The plates are typically stacked, sealed and configured to accommodate intake and exhaust streams flowing in either cross-flow or counter-flow configurations between alternate plate pairs, so that heat and humidity are transferred between the streams via the membrane.

Other types of exchangers include hollow tube humidifiers and enthalpy wheel humidifiers. Hollow tube humidifiers have the disadvantage of high pressure drop, and enthalpy wheels tend to be unreliable because they have moving parts and tend to have a higher leak rate.

A heat recovery ventilator (HRV) is a mechanical device that incorporates a heat and humidity exchanger in a ventilation system for providing controlled ventilation into a building. The heat and humidity exchanger heats or cools incoming fresh air using exhaust air. Devices that also exchange moisture between the incoming fresh air and the exhaust air are generally referred to as Energy Recovery Ventilators (ERVs), sometimes also referred to as Enthalpy Recovery Ventilators. An ERV may remove excess humidity from the ventilating air that is being brought into a building or it may add humidity to the ventilating air. ERVs may be used to save energy and/or to improve indoor air quality in buildings.

ERVs typically comprise an enclosure, fans to move the air streams, ducting, as well as filters, control electronics and other components. The key component in the ERV which transfers the heat and humidity between the air streams is called the core or the exchanger. The two most common types of ERVs are those based on planar membrane plate-type devices and those based on rotating enthalpy wheel devices, both mentioned above. Planar plate-type ERV cores use layers of static plates that are sealed and configured to accommodate the intake and exhaust streams flowing in either cross-flow or counter-flow configurations between alternate pairs of plates.

FIG. 1 shows an example of a planar plate-type heat and humidity exchanger made from stacked planar sheets of membrane 3 with rigid corrugated spacers 6 inserted between the membrane sheets. The spacers maintain proper sheet spacing as well as defining airflow channels 5 for wet and dry streams on opposite sides of each membrane sheet, in a cross-flow arrangement, as indicated by broad arrows 1 and 2 respectively. The stack is encased within a rigid frame 4.

A benefit of planar plate-type heat and humidity exchanger designs for ERV, fuel cell, and other applications, is that they are readily scalable because the quantity (as well as the dimensions) of the modular membrane plates can be adjusted for different end-use applications. Existing planar plate-type ERV cores are bulky and less effective than would be desired in facilitating enthalpy exchange.

Another approach to heat and humidity exchanger design is to incorporate a pleated water-permeable material in the exchanger. For example, U.S. Pat. No. 4,040,804 describes a heat and moisture exchanger for exchanging heat and moisture between incoming and outgoing air for room ventilation. The exchanger has a cartridge containing a single pleated sheet of water-permeable paper. Air is directed in one direction along the pleats on one side of the pleated paper, and the return air flows in the opposite direction along the pleats on the other side of the pleated paper. The ends of the cartridge are closed by dipping them in wax or a potting compound that can be cast and that adheres to the paper. The pleats are separated or spaced, and air passages between the folds are provided, by adhering grains of sand to the pleated paper.

FIG. 2 shows an example of a heat and humidity exchanger suitable for energy recovery ventilator (ERV) applications which comprises a pleated water-permeable membrane cartridge disposed in a housing. A plastic flow field element can be disposed within some or all of the folds of the pleated membrane for directing the stream over the inner surfaces of the folds, as described in US Patent Application Publication No. 2008/0085437. The flow field element controls the relative flow paths of the two streams on opposite sides of the membrane and enhances flow distribution across one or both membrane surfaces. The flow field elements can also assist in supporting the pleated membrane and controlling the pleat spacing within the pleated membrane cartridge. In the embodiment shown in FIG. 2, a first fluid stream is directed in a U-shaped flow path 122 from an inlet port 124 on one face of housing 115 to an outlet port 128 on the same face of housing 115. The first fluid stream is thus directed from inlet port 124 into a set of substantially parallel folds 126 on one side of pleated membrane cartridge 120, then along the length of the folds 126, and then out via port 128. A second fluid stream is similarly directed in a substantially U-shaped flow path 132 from an inlet port 134 to an outlet port 138 on the same face of housing 115 (both ports 134 and 138 being on the opposite face of housing 115 from ports 124 and 128). The second fluid stream is directed from port 134 into a corresponding set of substantially parallel folds 136 on the other side of pleated membrane cartridge 120, then along the length of the folds 136, and then out via port 138. The flow path 122 of the first fluid stream is in a substantially counter-flow configuration relative to flow path 132 of the second fluid stream.

There are also examples of ERV cores with stacked planar membrane sheets that operate in a substantially counter-flow configuration to transfer heat and humidity across planar membrane sheets. The membrane sheets can be interleaved with rigid plastic spacers that define flow channels as described in U.S. Pat. No. 7,331,376.

The flow field inserts or spacers used in the heat and humidity exchangers described above often provide controlled or directional gas flow distribution over the membrane surface. However, the fluid flow paths across the membrane surface tend to be quite tortuous and turbulent, so the flow can be quite restricted and the pressure drop across the overall apparatus can be significant. If there are many closely-spaced ribs to support the membrane, the ribs will tend to impede or block the fluid flow, and also increase pressure drop. With more widely-spaced ribs the membrane can deflect into the channel also increasing the pressure drop. Therefore, the use of non-permeable flow field inserts is generally undesirable.

Compact heat and humidity exchangers or HRV cores in which there is heat transfer between channels in two dimensions in counter-flow are described in U.S. Pat. No. 5,725,051 in which the heat transfer medium is a thermoformed rigid plastic sheet. The plastic is impermeable to water so there is no humidity transfer across the medium. In another similar example, the heat transfer medium is aluminum, but again there is no humidity transfer because the medium is not water-permeable.

As described above, conventional ERV cores with a water-permeable membrane require a spacer to support the membrane. Spacers generally impede or block heat and moisture transfer and they can increase the pressure drop if there is deflection of the membrane into the channel.

The inventors have recognized that there remains a need for cost effective and efficient ERV systems and cores.

SUMMARY

This invention has several aspects and encompasses a wide range of specific embodiments. Aspects of the invention provide building ventilation systems; heat and humidity exchangers; cores for heat and humidity exchangers; sub-assemblies for cores of heat and humidity exchangers; and methods for fabricating heat and humidity exchangers.

One example aspect provides a heat and humidity exchanger comprising a core. The core comprises a plurality of water vapor-permeable sheets. The sheets are layered or stacked. At least some of the sheets are pleated to provide a plurality of groups of channels extending through the core. Each of the plurality of groups of channels comprises channels defined between two adjacent ones of the sheets and extending along the pleats of at least one of the pleated sheets. A plurality of plenums is formed on opposed sides of the core. The plenums on each of the opposed sides of the core are configured such that the channels of groups of channels on opposing sides of the same one of the sheets are fluidly connected to different ones of the plenums. The plenums are defined at least in part by manifold members attached along opposite edges of the sheets, at least one of the manifold members comprising a sheet that is connected to and follows an edge of one of the pleated water vapor-permeable sheets.

Another aspect provides a heat and humidity exchanger comprising a core comprising a plurality of channels. A first group of the plurality of channels extends from a first plenum through the core to a second plenum. A second group of the plurality of channels extends from a third plenum through the core to a fourth plenum. Each of the plurality of channels in the first group has walls in common with a plurality of the channels of the second group and each of the plurality of channels in the second group having walls in common with a plurality of the channels of the first group. The plurality of channels is defined by a plurality of water vapor-permeable membrane sheets. At least one of the water vapor-permeable membrane sheets being pleated. The pleated water vapor-permeable membrane sheet defines a plurality of the walls of each of a plurality of the first group of channels. The first and fourth plenums are separated at least in part by a manifold sheet that is connected to and follows an edge of the pleated water vapor-permeable membrane sheet.

Another aspect provides a heat and humidity exchanger comprising a core comprising a plurality of channels each having a triangular cross-section. A first group of the plurality of channels extends from a first plenum through the core to a second plenum. A second group of the plurality of channels extends from a third plenum through the core to a fourth plenum. Each of the plurality of channels in the first group has walls in common with a plurality of the channels of the second group and each of the plurality of channels in the second group has walls in common with a plurality of the channels of the first group. Each of the common walls is water vapor-permeable.

Another aspect provides a heat and water vapor exchanger comprising a core structure comprising a plurality of layered water vapor permeable sheets attached together to form a self-supporting structure. A plurality of the layered water vapor permeable sheets are pleated such that triangular channels extend through the core. A manifold structure comprises manifold members attached along edges of the vapor permeable membrane sheets of the core. The manifold members form stacked plenums such that channels extending through the core between different pairs of adjacent ones of the water vapor permeable membrane sheets are in fluid communication with different ones of the plenums.

Further aspects of the invention and features of example embodiments of the invention are described below.

BRIEF DESCRIPTION OF THE DRAWINGS

The accompanying drawings illustrate non-limiting embodiments of the invention.

DETAILED DESCRIPTION

Figure 1:
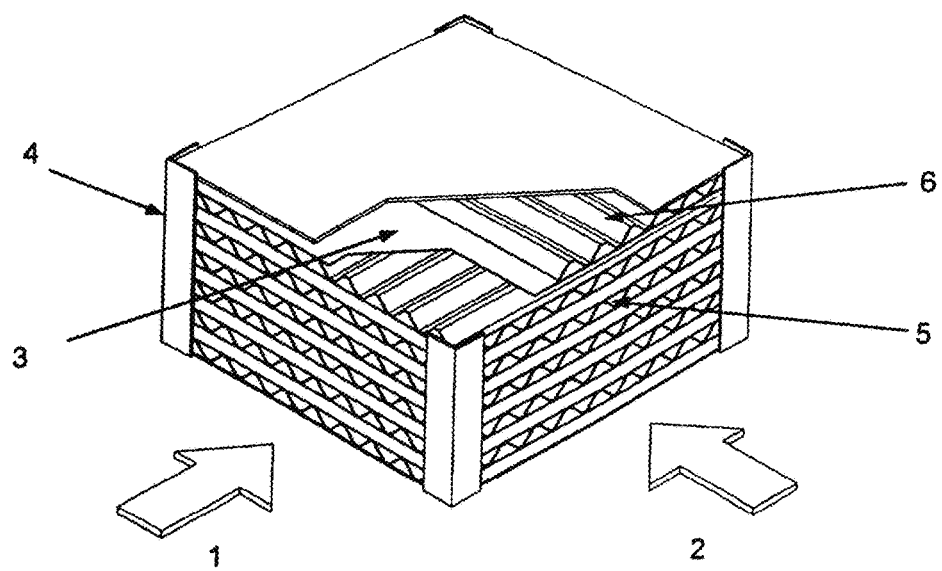
FIG. 1 is an isometric view of a heat and humidity exchanger comprising a stack of planar membrane layers interleaved with rigid corrugated spacers (prior art).
Figure 2:
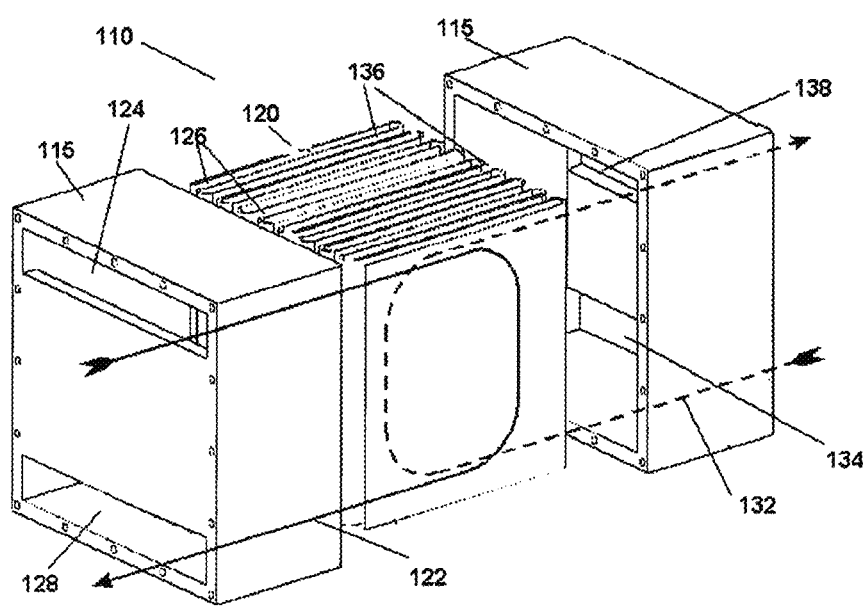
FIG. 2 is an isometric view of a heat and humidity exchanger comprising a pleated membrane cartridge disposed in a housing (prior art).

FIGS. 1 and 2 are described above.

Performance of heat and humidity exchangers can be improved, and the required heat and humidity exchanger size can be reduced, by providing heat and humidity exchanger constructions that provide one or more of: enhancing flow distribution across one or both surfaces of heat and vapor exchange membranes; controlling the relative flow paths of fluids on opposite sides of heat and vapor exchange membranes; providing improved support for heat and vapor exchange membranes; reduced pressure drop across the heat and humidity exchanger; increased membrane surface area per unit volume of the exchanger; and/or membranes that have improved water transport and other properties.

Certain embodiments disclosed herein provide ERV cores with water-permeable membranes configured to allow multi-dimensional transfer of moisture as well as heat. Multi-dimensional transfer across a water-permeable membrane can provide more efficient energy recovery and allow the ERV core to be more compact for a given level of performance. Embodiments as described herein may be used to transfer heat and moisture between two streams flowing in a counter-flow configuration for more efficient energy recovery.

Designs and manufacturing methods as described herein may be applied to provide ERV core constructions that are free of spacers. In such constructions, thin, flexible membranes may be shaped and attached to one another to provide self-supporting layers and core structures that are robust enough to withstand significant pressure differentials.

Figure 3:
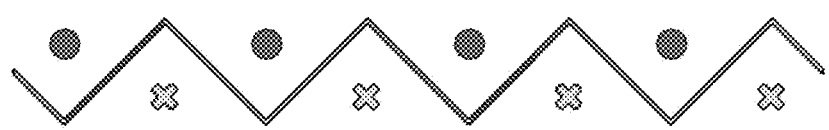
FIG. 3 is a schematic cross-sectional view of a pleated water-permeable membrane.

FIG. 3 is a cross-sectional view showing a sheet of pleated water-permeable membrane. The pleated membrane defines the walls of channels through which a fluid stream (e.g. wet or dry air) can be directed to flow, and across which heat and humidity may be exchanged. The membrane may be attached to plastic manifold sections (as described in more detail below) to direct the fluid stream from inlet ports into the channels and from the channels to outlet ports. The membrane should be sufficiently thin to allow adequate exchange of heat between the two streams, driven by the temperature gradient between the streams. The membrane is also water-permeable to allow moisture to pass through the material, driven by the vapor pressure differential or water concentration gradient between the two streams. Thinner membranes will tend to have higher heat and moisture transport rates. Ideally the membrane is also impermeable to air, and contaminant gases, to prevent the mixing and crossover of the two streams through the membrane.

In the present approach, layers of pleated membrane are stacked to form a sub-assembly or cartridge for disposition in a heat and humidity exchanger. The pleated membrane may be prepared, for example, by folding a sheet of membrane such as with heat and/pressure to provide plastic deformation to the folded edge (e.g. with push-bar pleating technology), or by forming a membrane to have pleats, such as with gears or score-and-pleat rotary pleating technology. The angle of the pleats may be varied. For a constant channel hydraulic diameter, larger pleat tip angles allow more layers of membrane to be provided in a core of a certain height, but with less overall membrane area per layer. Conversely, for a constant channel hydraulic diameter, smaller pleat tip angles will provide more membrane area per layer but fewer layers for the same core. In some embodiments, the pleats are formed to have angles in the range of 70 degrees to 100 degrees. Some embodiments have pleat angles in the range of 50 to 70 degrees (e.g. 60 degrees). Pleat tip angles close to 60 degrees can advantageously provide improved heat and mass transfer, with the high use of membrane area, for a given core height.

Figure 4A:
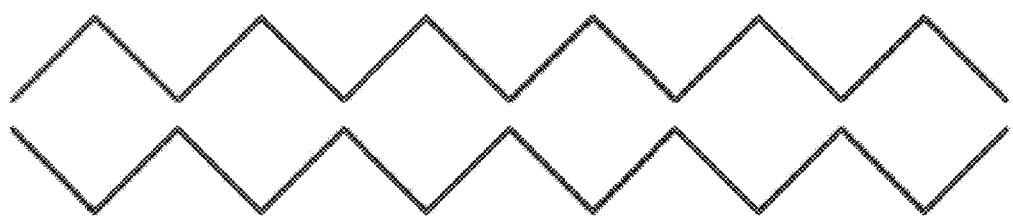
FIG. 4A is a schematic cross-sectional view illustrating two pleated water-permeable membrane sheets that can be joined to form a diamond-shaped channel.

FIG. 4A is a cross-sectional view illustrating two pleated water-permeable membrane sheets that can be joined to form channels with a diamond-shaped cross-section (or a parallelogram-shaped cross-section). The peaks of one pleated membrane can be attached to the peaks of the adjacent pleated membrane, for example, by gluing, bonding, heat-welding or sealing. In this configuration, the joined pleated membrane sheets are self-supporting and require no spacer or supporting material other than the membrane itself. Adhering, or otherwise attaching, peaks in one pleated membrane sheet to peaks in adjacent membrane sheets can provide sufficient strength for the membrane channel to withstand a pressure differential. In some embodiments, a polyurethane glue is used to adhere the peaks of one pleated membrane to the corresponding peaks of an adjacent membrane. Other suitable glues or adhesives can also be used for the same purpose. Glues that are permeable to water vapor will allow water transport to occur even in the regions where the pleated membranes are attached to one another. Glues that are permeable to water vapor transfer may be of the class that are polymer-based, with soft chain sections that allow water to pass through, such as Permax™ from Lubrizol. Depending on the membrane material, it may be possible to weld the pleated membrane sheets to one another at the peaks. For example, thermal, vibration or ultrasonic welding may be used.

Figure 4B:
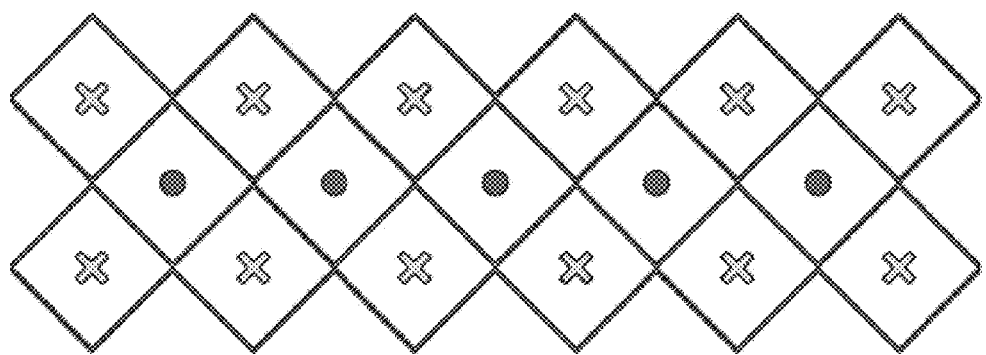
FIG. 4B is a schematic cross-sectional view illustrating four pleated water-permeable membrane sheets arranged to form an array of diamond-shaped channels.

FIG. 4B is a cross-sectional view illustrating four pleated water-permeable membrane sheets arranged to form an array of diamond-shaped channels. Two different fluid streams can be directed through alternate channels in a counter-flow configuration. Flow into the plane of the paper is indicated by a cross, and flow out of the plane of the paper is indicated by a dot. In such an array each diamond-shaped channel shares its walls with as many as four other channels. Heat and humidity can be transferred across all four walls of the channel through the water-permeable membrane. For a given channel, the flow in adjacent channels is in the opposite direction to the flow in the given channel. This is referred to as a counter-flow configuration.

Each fluid stream is independent of the other and does not depend on the peak-to-peak adhesion of the pleated membranes to provide a seal, so there is reduced potential for cross-leakage between the two streams. If a peak seal were not perfect, any leak into an adjacent channel would be a channel carrying the same fluid, and would not cause mixing of the two streams or adversely affect heat or mass transfer.

Figure 4C:
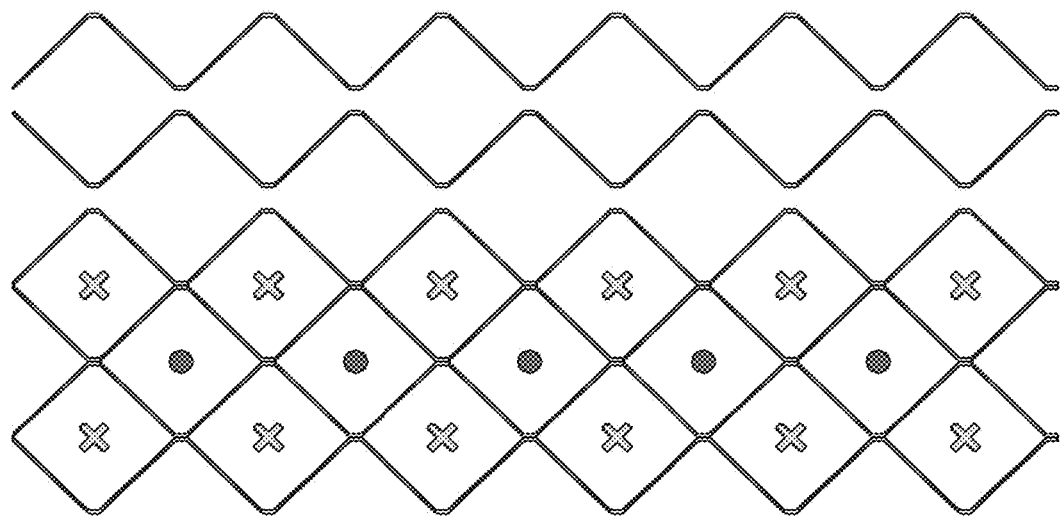
FIG. 4C is a schematic cross-sectional view of a pleated membrane combination like those shown in FIGS. 4A and 4B with flattened peaks.

FIG. 4C is a cross-sectional view also showing an arrangement of water-permeable membrane sheets forming an array of diamond-shaped channels. In this example, the peaks of the diamonds, along the pleated lines of the membrane, are flattened to provide a larger area for attachment to peaks in adjacent membrane sheets. This embodiment can provide a mechanically stronger sub-assembly of membrane sheets with substantially the same sensible and latent transfer as the arrangement shown in FIG. 4B. An alternative to flattening the peaks is to form the peaks of one pleated membrane layer, with a small trough or valley that extends along the crests of the peaks. Peaks of an adjacent layer may then nest into the troughs or valleys. Such troughs or valleys may be formed in the crests on only one face of the pleated membrane layer or in the crests on both faces of the pleated membrane layer.

Figure 4D:
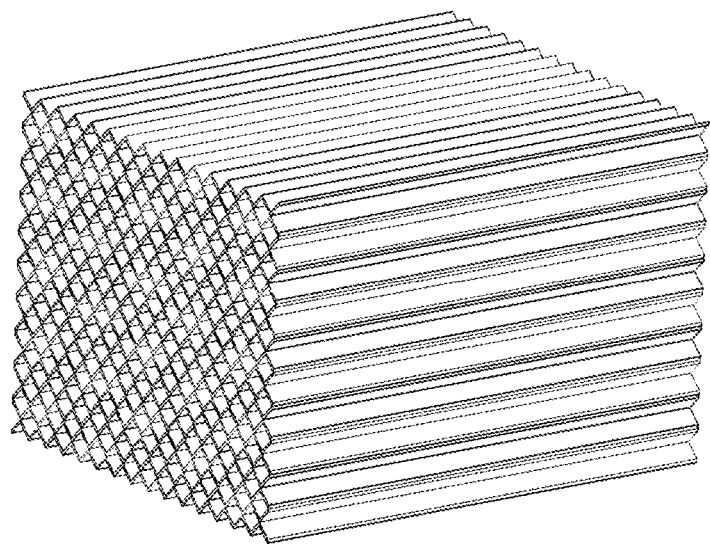
FIG. 4D is a non-isometric 3D view of an embodiment of an ERV core showing the central pleated membrane section with diamond- or parallelogram-shaped channels.

FIG. 4D shows a 3D representation of a stacked pleated membrane sub-assembly with diamond-shaped channels. Even though it can be made using a thin, flexible membrane material, the structure is self-supporting. This approach of stacking and gluing (or otherwise attaching) pleated membrane sheets provides a very high membrane surface area per unit volume of the exchanger providing a device with high effectiveness of heat and moisture transfer.

Figure 5A:
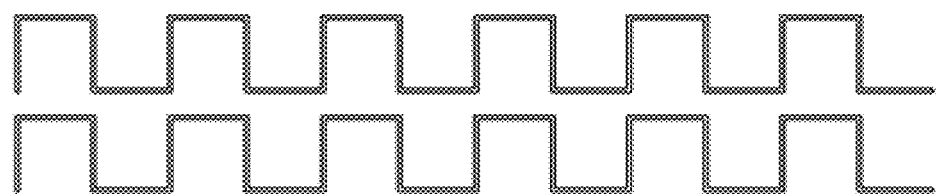
FIG. 5A is a schematic cross-sectional view illustrating two box-pleated water-permeable membrane sheets that can be joined to form channels of a square or rectangular cross-section.

FIG. 5A is a cross-sectional view illustrating two box-pleated water-permeable membrane sheets that can be joined to form channels with a square or rectangular cross-section. In this example, the box-pleats form a castellation, and the castellation pattern is offset between adjacent membrane sheets allowing the sheets to be joined to form square or rectangular channels. Each pleat line on one of the membrane sheets is glued, or otherwise attached, to the corresponding pleat line on an adjacent membrane sheet. Like the diamond configuration described above, the glued membrane sheets are self-supporting and require no spacers or other material to provide rigidity or support, and the channels are able to withstand pressure differentials.

Figure 5B:
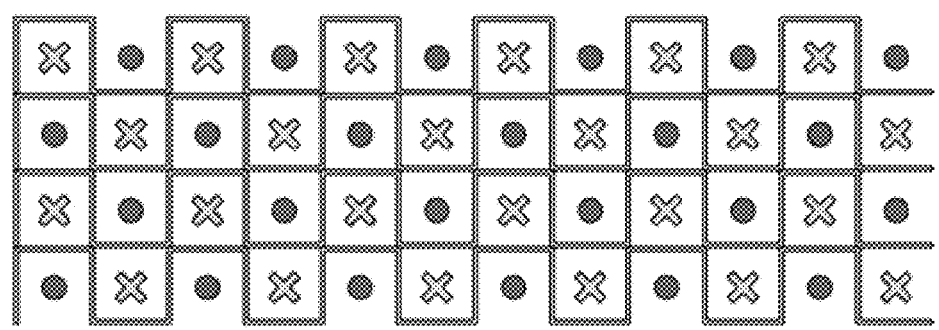
FIG. 5B is a schematic cross-sectional view illustrating four pleated water-permeable membrane sheets arranged to form an array of square- or rectangular-shaped channels.

FIG. 5B is a cross-sectional view illustrating four box-pleated water-permeable membrane sheets arranged to form an array of square-shaped or rectangular-shaped channels. Two different fluid streams can be directed through alternate channels in a counter-flow configuration. As before, flow into the plane of the paper is indicated by a cross, and flow out of the plane of the paper is indicated by a dot. Each channel shares its walls with as many as four other channels. Heat and humidity can be transferred across all four walls through the water-permeable membrane.

The square- and diamond-shaped channels arrangements are topologically and functionally equivalent, and sub-assemblies with square channels can be oriented during assembly to provide diamond channels and vice versa. Other channel shapes such as parallelograms may also be created by stacking layers of pleated membranes.

In some embodiments, the pleated membrane sheets may be separated by a mesh or other suitable material, configured in a sheet or in strips arranged perpendicular to the channels, or other suitable configuration. This construction can be used instead of, or in addition to, the use of glue or welding along the pleat lines. This approach can reduce the tendency for the pleats to slip into one another during assembly and can provide structural support. This construction can be applied in the square or diamond arrangements described above.

Figure 6A:
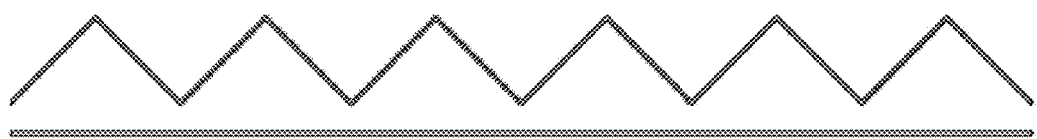
FIG. 6A is a schematic cross-sectional view illustrating a pleated and a flat sheet of water-permeable membrane that can be joined to form channels of triangular cross-section.

FIG. 6A is a cross-sectional view showing a pleated water-permeable membrane sheet and a flat water-permeable membrane sheet positioned below it. The pleated lines (the lower peaks in the cross-sectional view) in the pleated membrane sheet can be glued, welded or otherwise attached to the flat membrane sheet to create parallel channels of triangular cross-section. These channels each have three boundaries across which heat and humidity can be transferred. Stacking alternate sheets of pleated membrane and flat membrane creates a mechanically self-supported structure that requires no spacers or other supporting material. In this arrangement, again all flow channels walls are water-permeable allowing heat and humidity transfer to occur between all adjacent channels.

Figure 6B:
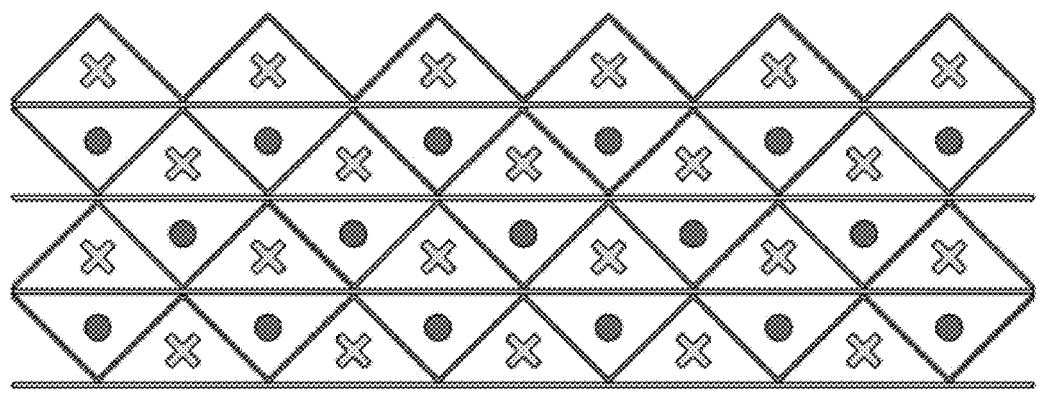
FIG. 6B is a schematic cross-sectional view showing a stack of alternating pleated and flat sheets of water-permeable membrane forming a sub-assembly of channels of triangular cross-section.

FIG. 6B is a cross-sectional view of a stack of membrane sheets in this configuration with the membranes forming an array of channels that are triangular in cross-section. Two different fluid streams can be directed through alternate channels in a counter-flow configuration. As before, flow into the plane of the paper is indicated by a cross, and flow out of the plane of the paper is indicated by a dot. Each channel shares its walls with as many as three other channels. Heat and humidity can be transferred across all three walls through the water-permeable membrane.

The manufacturing method of pleating and then gluing, welding or otherwise attaching pleated membrane sheets to one another allows thinner membrane materials to be used and still have the strength to be self-supporting in the resulting 3D-structure. The resulting sub-assembly does not have to be held under tension. Furthermore this self-supporting structure can provide channels having walls that offer increased rigidity because they are supported by other parts of the structure even though the walls may be formed of a relatively thin, flexible membrane material. This increased rigidity may offer reduced pressure drop and improved uniformity of flow distribution through the core. Further, the structure facilitates providing channels that have consistent channel dimensions which further aids in achieving good uniformity of flow among the channels.

In the embodiments of stacked, pleated membrane sub-assemblies described above the pleated water-permeable membrane layers define a three-dimensional array of parallel channels arranged in a regular pattern. Each of the channel walls, defined by the membrane material, separates channels of first and second types, e.g. for carrying wet and dry streams, respectively. The two fluid streams can be directed through the channels so that the wet and dry streams flow in counter-flow to one another. This provides more efficient transfer of heat and moisture with high sensible and latent transfer.

In order to provide manifolds for supply and discharge of the gas streams, the individual sheets of pleated membrane can each be attached to a manifold section (before they are stacked) forming a manifold/membrane sub-assembly. The manifold/membrane sub-assemblies may then be stacked and glued together to form a core. The manifold section can be in the form of a unitary frame that borders the sheet of pleated membrane on all sides, or can be in two (or more) separate pieces that are, for example, attached to opposite ends of the pleated membrane sheet.

The manifold section can be made of a different material than the membrane, such as a material that is not permeable to water or gas, and is stiffer and stronger than the membrane. For example, the manifold section material can be plastic, aluminum or any other suitable material that provides some structural support to the membrane and the stacked core, while still providing heat transfer in the manifold region. Preferably the material of the manifold section is less than 0.012 inches (about ¼ mm) in thickness. The manifold section may be made of a flame retardant material which will reduce the tendency for a flame to spread to the membrane section and increase compliance with flammability requirements. For example, the manifold section may be made of aluminum or other metals; PVC, which is generally inherently self-extinguishing; or a plastic comprising one or more flame-retardant additives, such as magnesium hydroxide.

Manifold sections may be made in a wide range of different ways. For example, features in manifold section(s) can be vacuum-formed or thermoformed or stamped therein. In some embodiments the manifold sections are formed with features and then attached to the membrane. Alternatively the manifold sections could be injection molded as separate plastic pieces, and then attached to the pleated membrane, or they could be injection molded directly onto the edges of the pleated membrane. The membrane can be adhered to the manifold section using a suitable glue, adhesive or other bonding agent, tape or the like. Some polyurethane-based glues have been found to be suitable for this purpose. Other types of adhesive can be used, such as epoxies, hot melts, cyanoacrylates, and even membrane coating materials that may also be useful to prevent or reduce crossover contamination. Alternatively, depending on the membrane and manifold section material, it may be possible to thermally weld, vibration weld, ultrasonically weld, or otherwise bond the components together.

The attachment of the membrane to the manifold section should create a leak-proof seal to prevent cross-contamination between the two fluid streams. The bond should be strong enough to prevent delamination of the membrane from the manifold section when there is a high differential pressure between the fluid streams on opposite sides of the membrane.

A benefit to this composite structure with pleated membrane adhered to the transitioning manifold sections is that the manifold sections may provide mechanical support to the water transfer membrane. Where manifold sections provide such mechanical support, the core may be self-supporting with reduced attachment between adjacent layers. Each layer may be constructed separately. The layers may each form a self-supporting structure, much like a truss. The layers, each including manifold sections and a moisture-exchange section may then be stacked together to form a heat and humidity exchanger.

The ratio of water-permeable membrane area to water impermeable manifold material area in the layers of the pleated membrane core assembly may be adjusted to adjust the relative amounts of sensible heat and latent heat (moisture) that are transferred by the pleated membrane core. Increasing the area of water permeable membrane facilitates increased moisture transfer.

In other embodiments the manifold section may comprise the same material as the water permeable membrane region, for example the manifold section may comprise a water-permeable membrane layer that is formable. This sheet of formable material may make up a layer that includes both a pleated region which will define counter-flow channels when stacked together with an adjacent layer and manifold regions that are configured so as, when stacked together with an adjacent layer, to direct a flow into channels at one end of the pleated region and to receive the flow on the other side of the pleated region (see FIG. 15 below, for example). For example, such a layer may be made of coated PET non-woven membrane, with properties that allow it to be molded or formed with pleats, ribs, bumps, and/or other out-of-plane features through the application of heat and/or pressure. Embodiments where a manifold section is also water-permeable permit increased humidity transfer due to the larger transfer area. The transition from the inlet or outlet to the center straight channels can follow the same lofting as described below, to transition from a wide rectangular area into alternating cells of channels arranged laterally.

The design of the manifold sections is such that, when they are stacked in the assembled core, they enable a first fluid stream to enter into alternate channels laterally (a first type of channel), and enable a second fluid stream (flowing through the core in the opposite direction) to exit from the other channels (second type of channel). Similarly at the other face of the core, the manifold receives the first fluid stream from the first channel type and directs the second fluid stream into the alternating channels of the second type. The two fluid streams are fluidly isolated from one another so that they do not mix. The manifolds can be designed to ensure smooth flow transition between the manifold regions and the channels so as to reduce or minimize the overall pressure drop through the exchanger device.

The manifold sections may be constructed to include features that improve performance of a heat and humidity exchanger by providing increased heat and/or humidity transfer between fluids and/or reduced pressure drop. For example:
  a. Ribs in intake manifold sections may be configured to direct flow evenly into each channel, and ribs in output manifold sections may be configured to allow flow from multiple channels to smoothly recombine into an output flow;
  b. In embodiments where the manifold is bounded on one side by a flat membrane sheet, ribs in the manifold sections may be arranged to provide good support to the membrane sheet by providing closer rib-to-rib spacing especially in areas where the membrane sheet could sag;
  c. Material of the manifold sections may be made thin (e.g. 0.004 inches to 0.012 inches—about 0.01 cm to 0.03 cm). The use of thin materials for the manifold section can enhance the smoothness of the transitions from channels into the manifolds, increase the cross-sectional areas of plenums formed between the manifold sections, and also improve heat transfer through the material of the manifold sections.

Figure 7A:
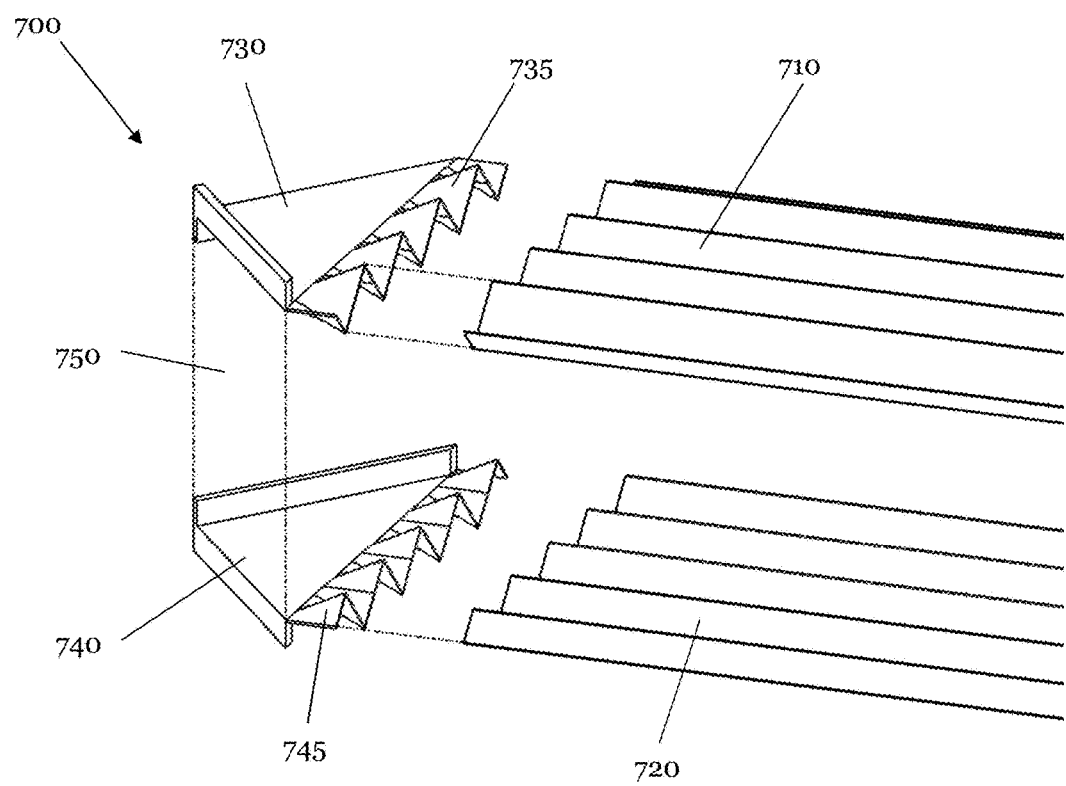
FIG. 7A is a simplified exploded 3D view of a pair of pleated membranes forming parallel channels with a diamond-shaped cross-section, with manifold sections attached to each membrane sheet.
Figure 7B:
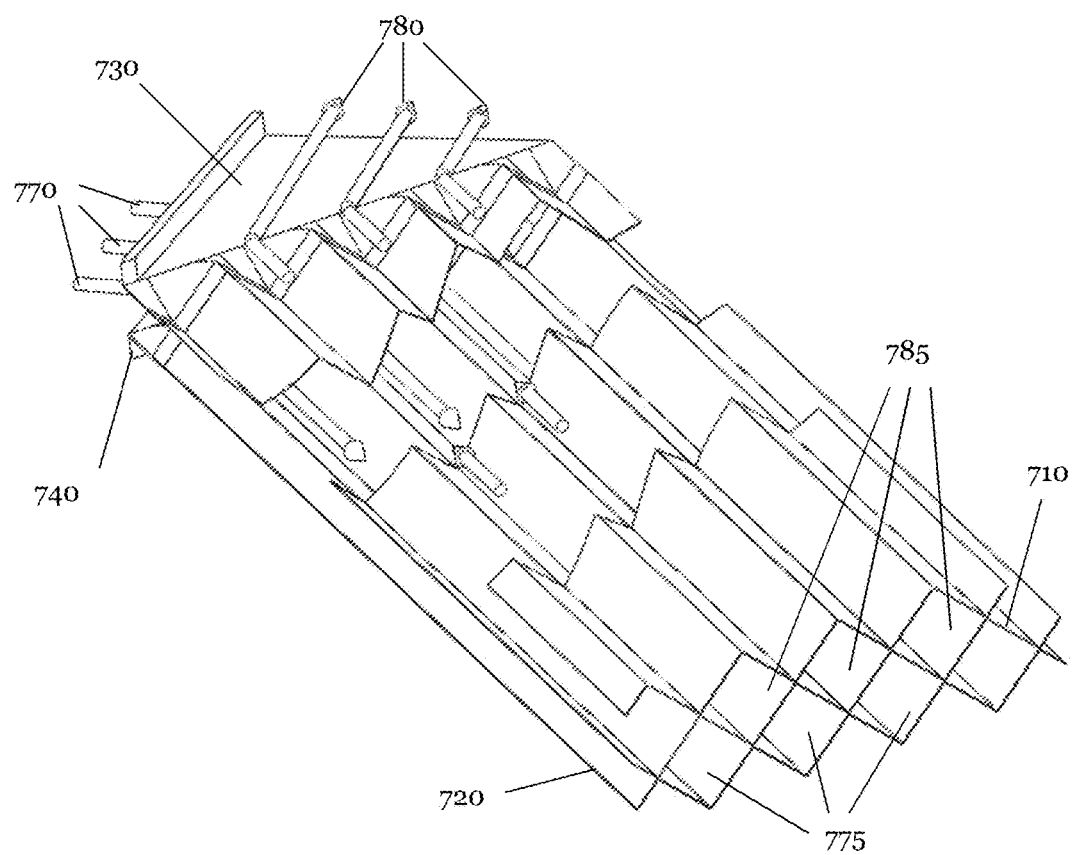
FIG. 7B shows a simplified 3D partial cut-away view of the assembly of FIG. 7A with two fluid streams following through the diamond-shaped channels in counter-flow.

FIG. 7A shows a simplified exploded 3D view of an assembly 700 comprising a pair of pleated membrane sheets 710 and 720 that, when stacked, form parallel channels with a diamond-shaped cross-section. Manifold sections 730 and 740 are attached to each membrane sheet. The two manifold sections form a plenum 750 between them, with a rectangular opening via which a first fluid stream can be supplied to the channels formed between the two membrane layers. The stacked manifold sections 730 and 740 are shaped to provide smooth transition regions 735 and 745 between the plenum 750, which has a rectangular cross-section, and the triangles that form half of each diamond-shaped channel. As another assembly is stacked above the one illustrated in FIG. 7A, a similar plenum is formed above the upper manifold section 730, for the second fluid steam which is exiting the diamond-shaped channels defined in part by upper surface of the upper membrane 710. Thus the stacked manifold sections form a series of layered plenums alternating for the first and second fluids respectively. FIG. 7B shows a simplified 3D partial cut-away view of two fluid streams following through the diamond-shaped channels in counter-flow. The first fluid stream (indicated by arrows 770) enters a first set of diamond-shaped channels 775 via the plenum formed between the two manifold sections 730 and 740, and the second fluid stream (indicated by arrows 780) exits a second set of diamond-shaped channels 785 via the plenum formed above the upper manifold section 730. The fluids are in a cross-flow configuration in the manifold region.

Figure 8:
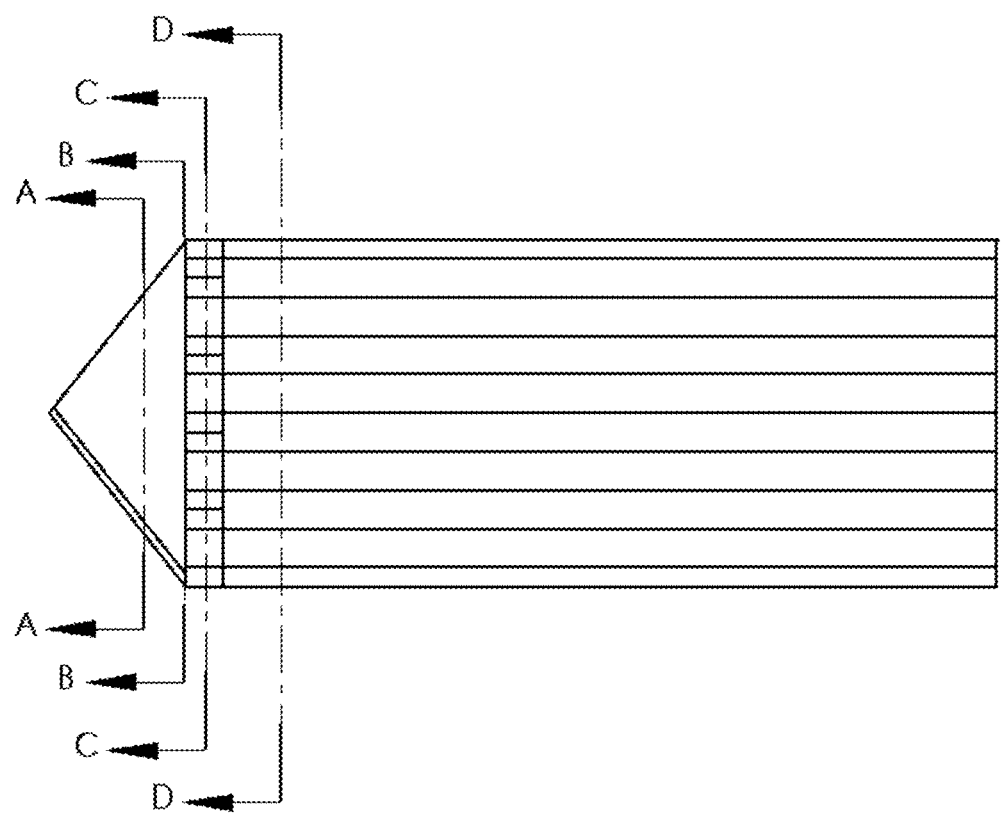
FIG. 8 is a plan view of the upper manifold/membrane assembly shown in FIGS. 7A & 7B.

FIG. 8 is a plan view of the upper manifold/membrane assembly shown in FIGS. 7A & 7B.

Figure 9A:
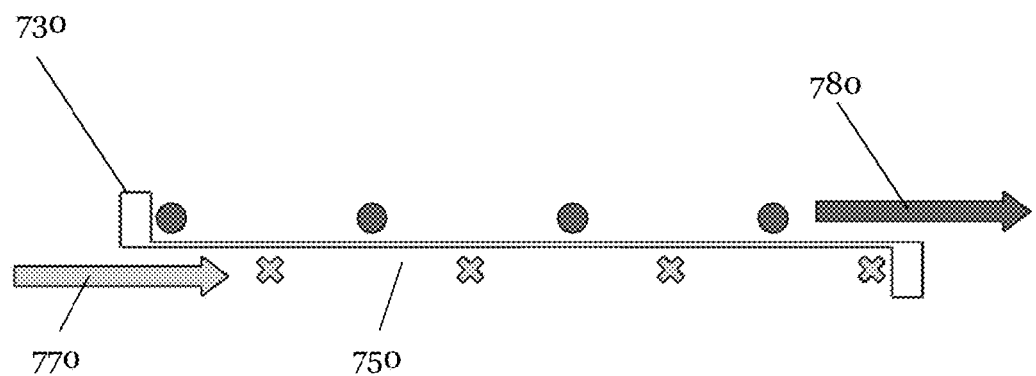
FIG. 9A is a cross-sectional view at location A-A in FIG. 8.
Figure 9B:
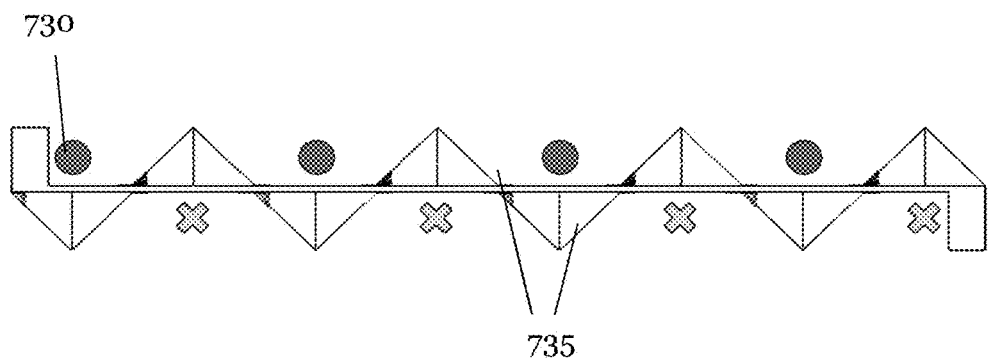
FIG. 9B shows a view looking down the channels from a cross-section at location B-B in FIG. 8.
Figure 9C:
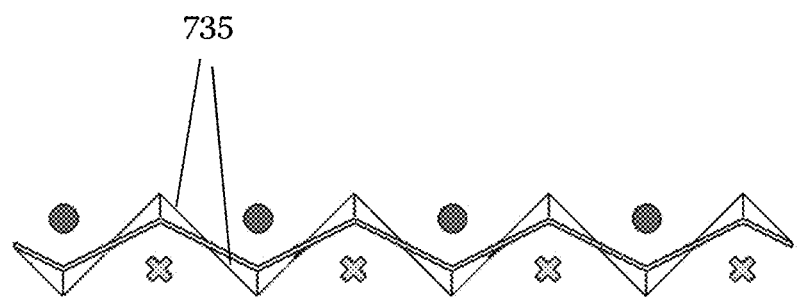
FIG. 9C shows a view looking down the channels from a cross-section at location C-C in FIG. 8.
Figure 9D:
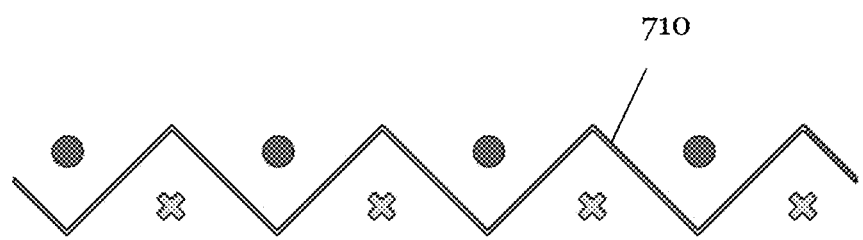
FIG. 9D is a cross-sectional view at location D-D in FIG. 8 showing the zig-zag cross-section of the pleated membrane.

FIGS. 9A-D are intended to illustrate the smooth transition from the manifold region into the channels. FIG. 9A is a cross-sectional view at location A-A in FIG. 8. FIG. 9A shows the plenum 750 for the first fluid stream 770 below the manifold section 730, and the plenum for the second fluid steam 780 above the manifold section 730. The first stream 770 enters the lower plenum 750 and the second stream 780 exits the upper plenum, as indicated by the broad arrows. FIG. 9B shows a view looking down the channels from a cross-section at location B-B in FIG. 8. The plenum floor/roof is still flat at this point but gradually transitions into a zig-zag cross-section to correspond to the membrane pleats. These transitions in the transition region 735 of manifold section 730 are visible in FIG. 9B as solid triangles above and below the flat plane of the plenum roof/floor. FIG. 9C shows a view looking down the channels from a cross-section at location C-C in FIG. 8. This shows the gradual shaping of the manifold section in transition region 735 into a wavy cross-section. At this point the waves are not quite as deep as the zig-zag membrane pleats, and the further slope of manifold transition regions 735 are visible above and below the wavy cross-section in FIG. 9C. FIG. 9D is a cross-sectional view at location D-D in FIG. 8 showing the zig-zag cross-section of the pleated membrane 710.

Figure 10:
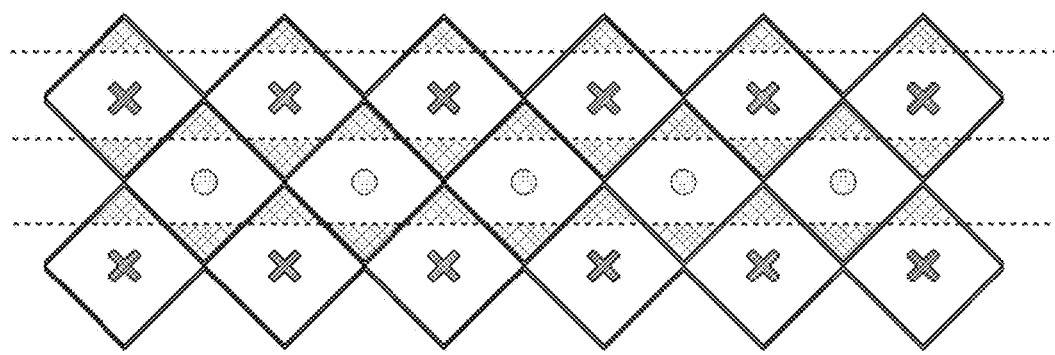
FIG. 10 is a diagram showing how the plenums created between adjacent manifold sections in a stacked core assembly (similar to that shown in FIG. 7) correspond to the diamond-shaped channels that they are supplying/discharging.

FIG. 10 shows how the plenums created between adjacent manifold sections in a stacked core assembly (similar to that shown in FIG. 7A) correspond to the diamond-shaped channels that they are supplying/discharging. The first fluid can flow in a straight path between the unshaded area of the channels of the first type and the supply plenum for the first fluid. Similarly, the second fluid can flow in a straight path between the unshaded area of the channels of the second and the discharge plenum for the second fluid. In this embodiment there is a straight path connection between the plenum and most of the cross-sectional area of the corresponding channels. This reduces the pressure drop by avoiding an abrupt transition in the direction of flow, and eliminating the need for a long transition region, between the plenum and the channel.

Figure 11A:
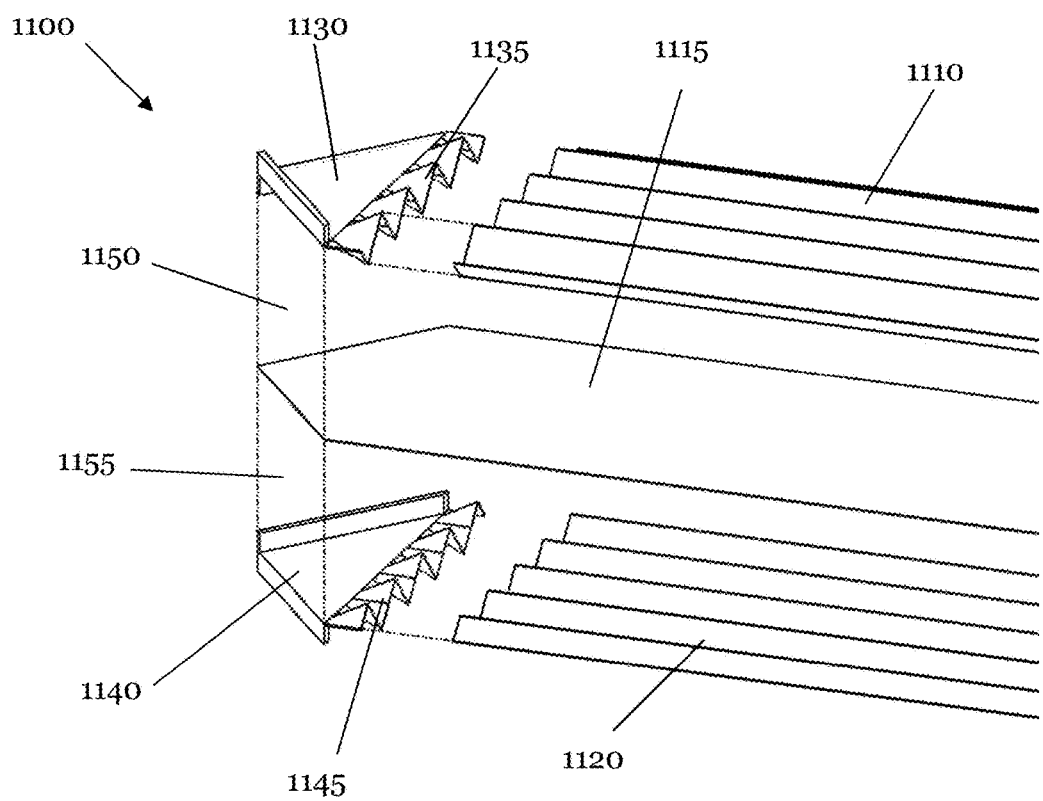
FIG. 11A is a simplified exploded isometric view of an assembly like that of FIG. 7A, but interleaved with an additional flat membrane sheet forming parallel channels with a triangular-shaped cross-section.
Figure 11B:
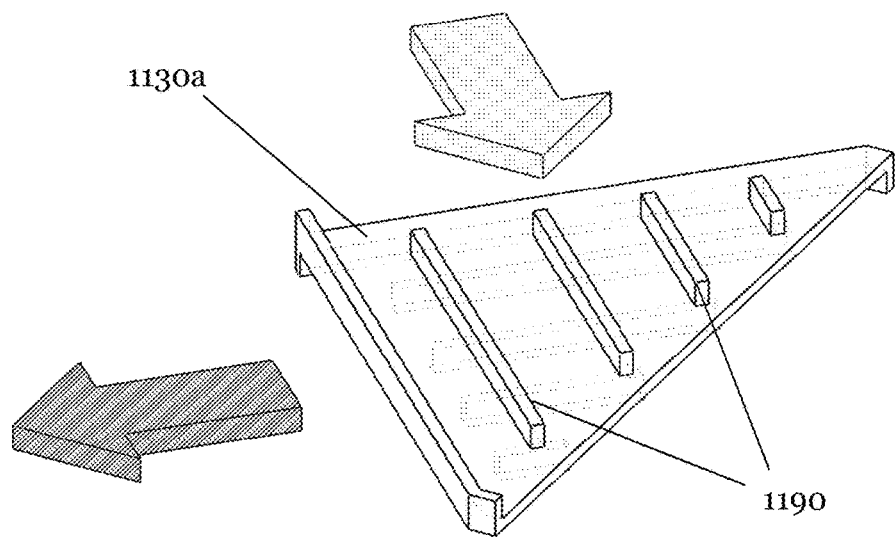
FIG. 11B shows the flow of the two fluid streams on opposite sides of a manifold section that has ribs to direct the flow.
Figure 11C:
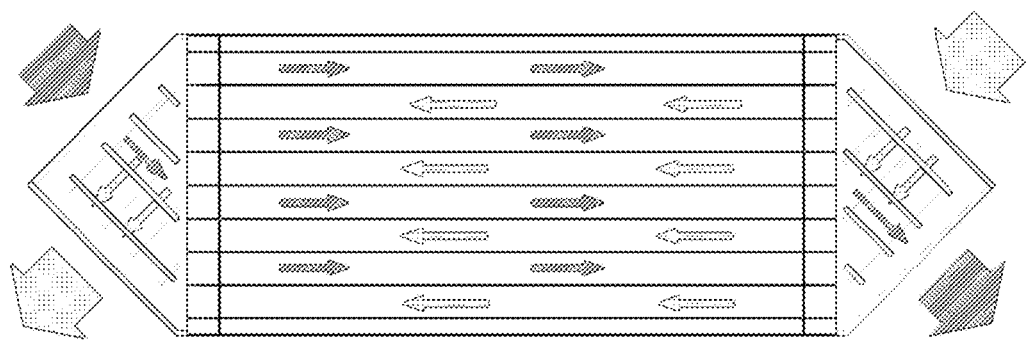
FIG. 11C is a plan view illustrating the flow pattern of the two fluid streams in an assembly similar to the one shown in FIG. 11A.

FIG. 11A shows a simplified exploded isometric view of an assembly 1100 like that of FIG. 7A, but with an additional flat membrane sheet 1115 interposed between the pair of pleated membrane sheets 1110 and 1120 thereby forming parallel channels with a triangular-shaped cross-section. The pleated membranes 1110 and 1120 are preferably glued or otherwise bonded to the flat membrane sheet 1115 along the pleat lines, to improve structural rigidity of the assembly and to allow the membrane channels to better withstand pressure differentials. The bond along the pleat lines does not need to be leak-proof, however, as any leak would be into an adjacent channel of the same type (i.e. carrying the same fluid stream). Manifold sections 1130 and 1140 are attached to each pleated membrane sheet. Plenums 1150 and 1155, each with a rectangular opening, are formed between each manifold section 1130 and 1140 and the adjacent flat membrane sheet 1115, via which a first and second fluid streams can be supplied to the channels formed between the pleated and flat membrane layers. The manifold sections 1130 and 1140 are shaped to provide smooth transition regions 1135 and 1145 between the plenums, which have a rectangular cross-section, and the triangular-shaped channels. FIG. 11B shows the flow of two fluid streams (in a cross-flow configuration) on opposite sides of one manifold section 1130*a* that in the illustrated embodiment has ribs 1190 to direct the flow and support the membrane 1115. FIG. 11C is a plan view illustrating the flow pattern of two fluid streams in an assembly similar to the one shown in FIG. 11A.

In the embodiment illustrated in FIG. 11A, the flat membrane sheet extends into manifold region. This can be advantageous as it allows heat and moisture transfer to occur between the fluid steams in adjacent plenums, as well as in the pleated membrane region. However, without adequate support in this region, deflection of the membrane can occur, increasing the pressure drop, and so it may be necessary to provide supporting ribs or features in the manifold sections. The flat sheet of membrane is attached to the edges of the adjacent manifold sections to create a leak-proof seal. Suitable adhesives, or welding techniques may be used, such as for example, thermal welding, vibration welding, ultrasonic welding, or RF welding.

In other similar embodiments, the flat membrane sheet does not extend into the manifold region, but is attached to manifold sections made from a different material. These stack with the manifold sections shown in FIG. 11A to define alternating plenums for the first and second fluid streams. In either case, the stacked manifold sections are shaped to provide smooth transitions between the plenums (which have a rectangular cross-section) and the triangular-shaped channels.

Figure 12:
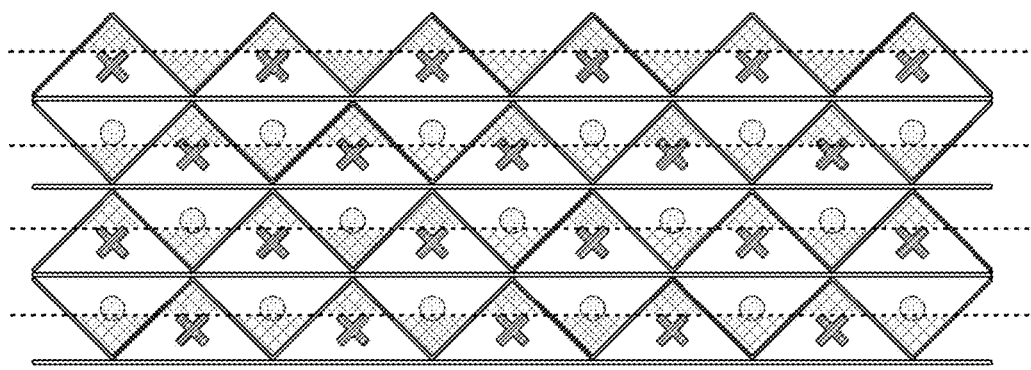
FIG. 12 is a diagram showing how the plenums created between the flat membrane sheets and adjacent manifold sections in a stacked core assembly (similar to that shown in FIG. 11) correspond to the triangular-shaped channels that they are supplying/discharging.

FIG. 12 shows how the plenums created between the flat membrane sheets and adjacent manifold sections in a stacked core assembly (similar to that shown in FIG. 11A) correspond to the triangular-shaped channels that they are supplying/discharging. The first fluid can flow in a straight path between unshaded area of the channels of the first type and the supply plenum for the first fluid. Similarly, the second fluid can flow in a straight path between the unshaded area of the channels of the second type and the discharge plenum for the second fluid. Once again, in this embodiment there is a straight path connection between the plenum and most of the cross-sectional area of the corresponding channels.

Figure 13:
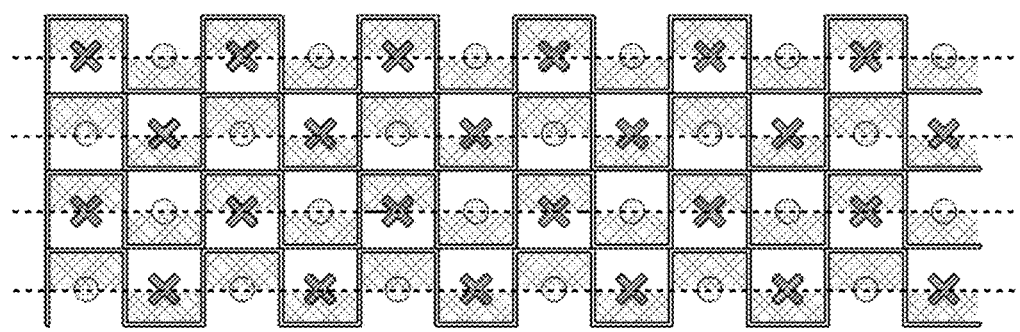
FIG. 13 shows how the plenums created between adjacent manifold sections in a stacked core assembly similar to that shown in FIG. 5B would correspond to the square-shaped channels that they are supplying/discharging.

A manifolding arrangement similar to those described above can be provided for box-pleated membrane sub-assemblies, such as shown in FIG. 5B. FIG. 13 shows how the plenums created between adjacent manifold sections in such a stacked core assembly would correspond to the square-shaped channels that they are supplying/discharging. The first fluid can flow in a straight path between unshaded area of the channels of the first type and the supply plenum for the first fluid. Similarly, the second fluid can flow in a straight path between the unshaded area of the channels of the second type and the discharge plenum for the second fluid. In this embodiment there is a straight path connection between the plenum and about 50% of the cross-sectional area of the corresponding channels.

The manifold sections can have features formed in one or both surfaces to direct the flow from the plenums into the corresponding channels, such as the ribs shown in FIG. 11B. Such features can, for example, improve flow distribution. They can also support the membrane if it extends into this region (for example, as in the embodiments illustrated in FIG. 11A). Features that will promote mixing or turbulence of the fluid streams can also be incorporated into the manifold sections to improve performance. The use of vacuum-formed or thermoformed manifold entrance and exit sections allows a variety of counter-flow sizes to be produced with varying channel heights without significant investment in tooling (such as would be the case with injection molded separators currently in use).

In illustrated embodiments the manifold members are each connected to the core along a first edge, have an up-turned wall along a second edge and a down-turned wall along a third edge such that, when stacked together the manifold members form a column of plenums that open alternately to sides corresponding to the first and second edges.

Figure 14A:
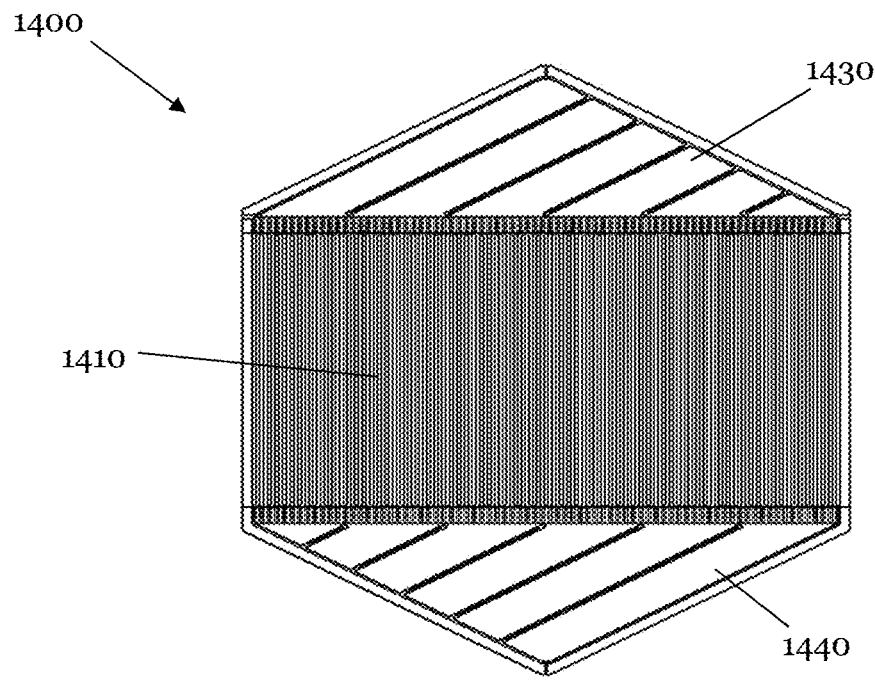
FIG. 14A is a plan view of a manifold/membrane subassembly with a central pleated membrane and a manifold section at each end, where the channels have a diamond cross-section.
Figure 14B:
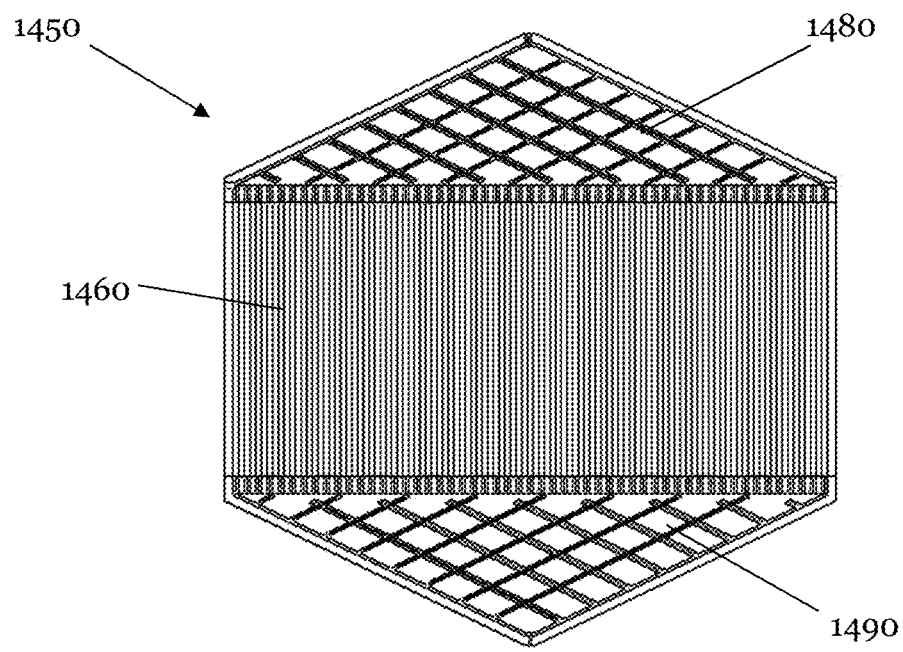
FIG. 14B is a plan view of a manifold/membrane subassembly with a central pleated membrane and a manifold section at each end, where the channels have a triangular cross-section.

FIG. 14A is a plan view of a manifold/membrane subassembly 1400 with a central pleated membrane 1410 and manifold sections 1430 and 1440 attached at each end, where the channels have a diamond cross-section. The manifold sections 1430 and 1440 include ribs on one side to direct the fluid stream into the respective channels. FIG. 14B is a plan view of a manifold/membrane subassembly 1450 with a central pleated membrane 1460 and manifold sections 1480 and 1490 attached at each end, where the channels have a triangular cross-section. In this embodiment the manifold sections 1480 and 1490 include ribs on both sides of the midplane of the manifold section to direct the fluid streams into the respective triangular-shaped channels.

The assembled core can be potted along the sides and ends. It can be encased in a metal or plastic frame which can also assist in blocking flame spread to allow for compliance with flammability standards. A metal frame can also act as a heat sink. For ERV applications the core can be housed in an enclosure, which can also house fans to move the air streams, ducting, as well as filters, control electronics and other components.

The present membrane cores are readily manufacturable and can be readily scaled to different sizes, as the pleated membrane can be cut to different sizes to suit the particular end-use application and the number of layers in the stack can be varied.

Any membrane material that can be pleated and has the requisite water-permeability and other properties, is suitable for use in the above-described pleated membrane cores. Membranes that have been used or suggested for ERV applications include cellulose films; cellulose fibre or glass fibre papers or porous polymer films that are coated or impregnated with a hydrophilic polymer or a hydrophilic polymer-desiccant mixture; thin film composites manufactured via interfacial polymerization; laminated membranes made from a blown film on a non-woven support layer; laminated membranes comprising an ionomer film bonded to a porous support; and sulphonated and carboxylated ionomer films. Other materials involve applying a water-permeable coating to the microporous substrate. Composite membrane materials comprising a porous desiccant-loaded polymer substrate that is coated on one surface with a water-permeable polymer have been found to be particularly suitable for ERV and similar applications. Examples of such membranes are described in published PCT Application No. WO2010/132983. Membranes of this type can retain a pleat once folded, which tends to increase the strength of the membrane channels in the core designs described herein.

In some embodiments, a membrane that is formable or can be corrugated may be used. Engineered composite membrane materials which can be formed to create features and hold various structures, may allow increased performance and decreased cost in membrane-based devices such as those described herein. For example, the use of a electrospun nanofibrous membrane on a formable backer in a counter-flow heat and humidity transfer device takes advantage of the formable property of the membrane. A number of methods may be available with which to form the membrane, e.g. with channels or other features, (with or without the use of heat) such as compression molding, vacuum forming or stamping.

Figure 15:
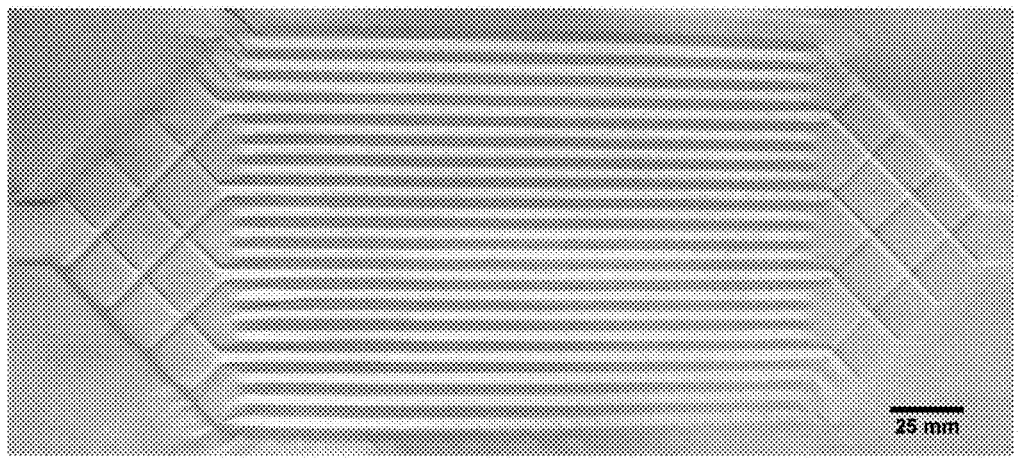
FIG. 15 is a photo of a compression molded layer made entirely from a formable water permeable membrane.

FIG. 15 is a photo of a layer made entirely from a formable water permeable membrane comprising a coated nanofibrous layer on a polyester spunbond nonwoven fabric support layer. The layer comprises manifold regions at each end, and a central section with straight channels, all made of the same material. The features were formed in the membrane layer by heating it (80° C.) in a compression mold. Such layers can be stacked to form an ERV core assembly In a specific example embodiment, sheets of polyester spunbond nonwoven fabric (Smash Specialty Nonwoven Y15100) were obtained from Asahi Kasei. These materials are designed for formability under low heat (<100° C.). Coatings of PAN nanofibres were deposited on these support layers with three different loadings. The nanofibrous layers were then impregnated with aqueous solutions of a polyetherpolyurethane co-polymer at three concentrations (13, 15, and 17% by weight). The materials were dried in an oven at 50° C.

EXPERIMENTAL EXAMPLES

Example 1

First Prototype ERV Core—Multi-Directional Transfer

Multi-directional transfer was demonstrated using a prototype with a vacuum-formed corrugated plastic spacer designed to have approximately the same heat transfer as a pleated membrane. The prototype showed the predicted increase in heat transfer compared to a counter-flow design with only vertical (1-dimensional) transfer for the same pressure drop. The increase was due to the multi-dimensional nature of the transfer.

Example 2

Second Prototype ERV Core—Pleated Membrane

A second prototype was made using pleated membrane in the counter-flow section, with thermoformed plastic manifold sections for the entrances and exits. A polyurethane glue was used to attach the membrane to the manifold sections. When compared on a normalized flow basis, the heat transfer compared favorably to state-of-the-art commercial HRV cores. The prototype performed better in moisture transfer than commercially available cores.

Figure 16:
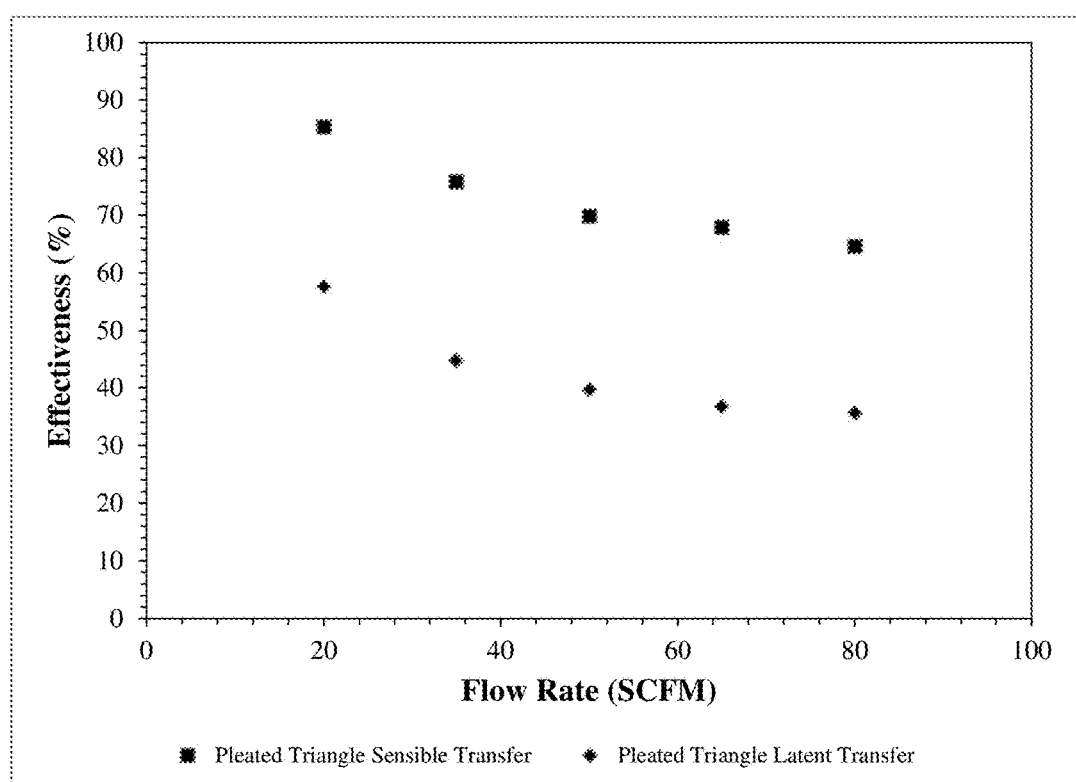
FIG. 16 is a graph illustrating the performance of an ERV core comprising a prototype stacked pleated membrane core.

The graph shown in FIG. 16 shows the performance of an ERV core, comprising this second prototype stacked pleated membrane, as a function of flow rate. The graph shows the effectiveness of sensible heat and latent (moisture) transfer for the pleated membrane core.

Example 3

Third and Fourth Prototype ERV Cores

A third prototype was made with triangular channels in a core with a larger footprint size. A fourth prototype was also built with taller triangular channels.

Figure 17:
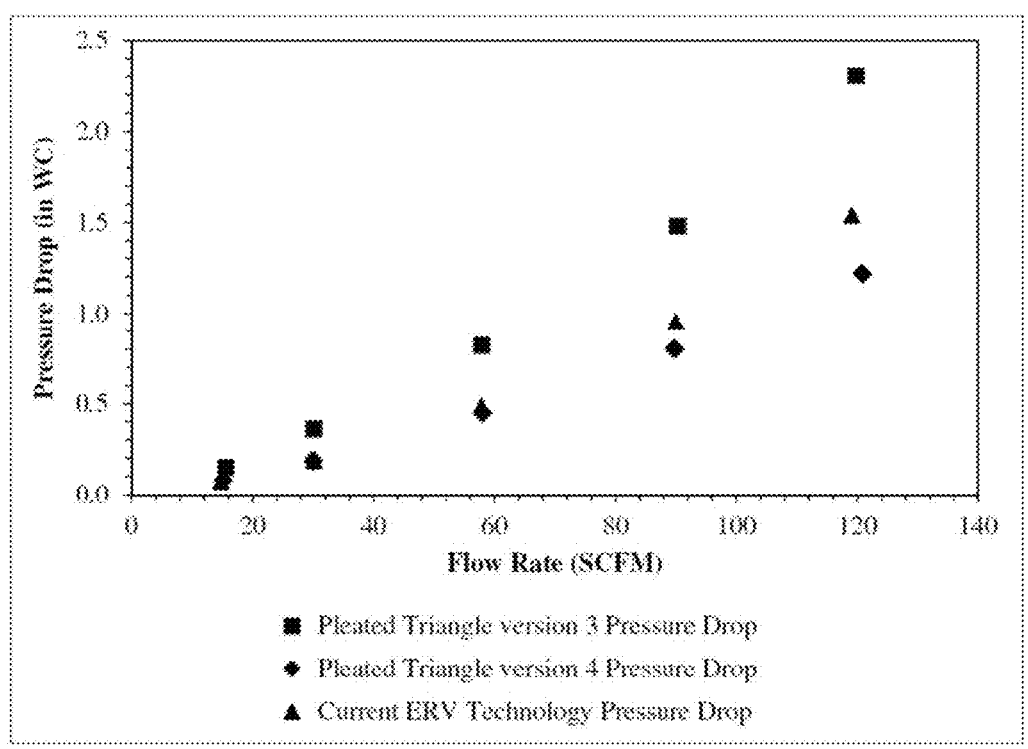
FIG. 17 is a graph illustrating the pressure drop for two prototype ERV cores comprising stacked triangular-pleated membranes.

Dimensions of the channels may be selected to provide a desired balance between rate of heat and mass transfer and pressure drop. The third prototype triangular-pleated membrane core had a pitch, or layer-to-layer membrane spacing, of 3.2 mm in the straight counter-flow section. This resulted in a channel entrance height of approximately 1.6 mm. Such a small height signifies a relatively low hydraulic diameter in the entrance and exit areas of each layer, resulting in a pressure drop that was higher than desired. The fourth prototype was constructed to demonstrate that pressure drop can be reduced by providing different channel dimensions. In the fourth prototype, the layer-to-layer spacing was 4.5 mm. This increased the entrance and exit heights of the manifolds to approximately 2.2 mm. The reduction in pressure drop achieved in the fourth prototype versus the third prototype is illustrated in FIG. 17.

With an increase in pitch spacing in the center channel section, fewer layers would be incorporated for the same overall height, or volume, of core. A reduction in number of layers would result in a reduction in the overall membrane surface area in the core, reducing the transport area and diminishing performance. However, this was compensated in the fourth prototype by incorporating more tightly spaced pleats (less distance between pleats) in the pleated counter flow sections, thereby packing more membrane in the straight counter-flow section in the middle of the core. By going from about a 90° pleat tip angle to about a 60° pleat tip angle, enough membrane was incorporated into the fourth prototype to offset the reduction in the number of layers.

An ERV is typically operated in laminar flow in the layers of the core, so heat and mass transfer is only a function of hydraulic diameter and Nusselt number (a type of dimensionless temperature gradient), which is constant for a given geometry if the flow is laminar. As discussed in the literature (e.g., Int. J. Heat Mass Transfer, Vol. 18, pp. 849-862, 1975), for triangular ducts in laminar flow the Nusselt number will decrease as one moves away from an equilateral triangle. The change of pleat angle from 90° to 60° in the fourth prototype therefore also compensated for the decrease in number of layers.

Figure 18:
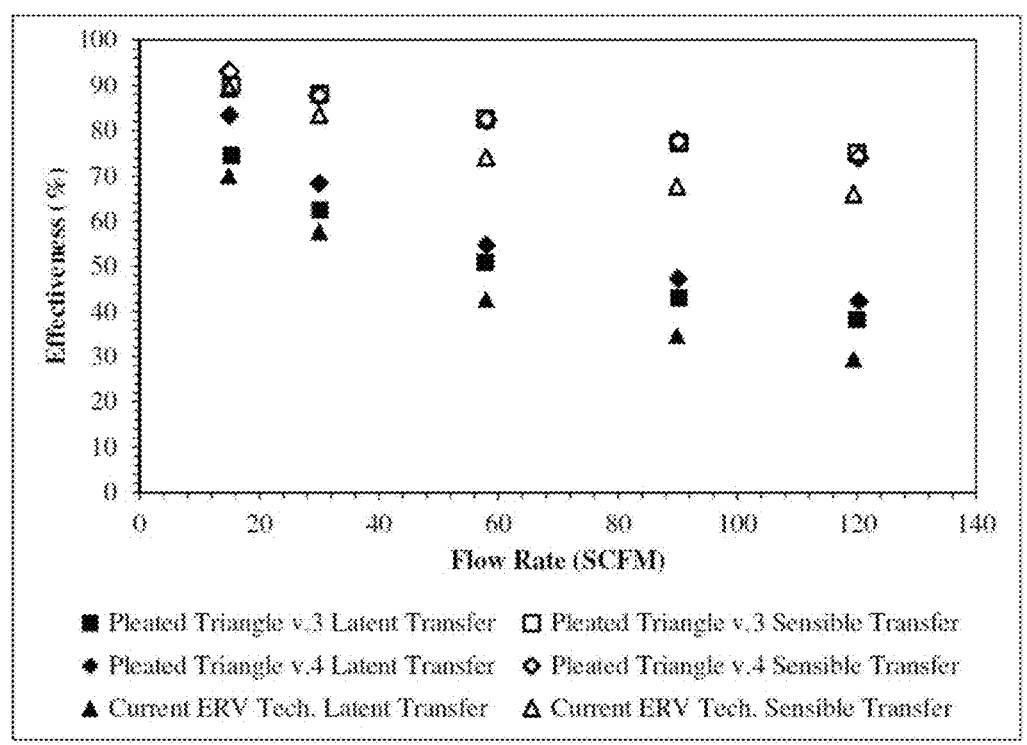
FIG. 18 is a graph illustrating the performance of the two prototype ERV cores comprising stacked triangular-pleated membranes.

The graph shown in FIG. 18 shows the performance of these third and fourth prototype ERV cores, as a function of flow rate. The graph shows the effectiveness of sensible heat and latent (moisture) transfer was quite similar for the two prototypes.

Heat and humidity exchangers as described herein may be applied, for example, to exchange heat and humidity between a flow of fresh air entering a building and a flow of air being vented from a building.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

Some non-limiting example enumerated embodiments of the present invention are as follows:

1. A heat and humidity exchanger comprising:
   a core comprising a plurality of water vapor-permeable sheets, the sheets layered and at least some of the sheets pleated to provide a plurality of groups of channels extending through the core, each of the plurality of groups of channels comprising channels defined between two adjacent ones of the sheets and extending along the pleats of at least one of the pleated sheets,
   a plurality of plenums formed on opposed sides of the core, the plenums on each of the opposed sides of the core configured such that the channels of groups of channels on opposing sides of the same one of the sheets are fluidly connected to different ones of the plenums;

wherein the plenums are defined at least in part by manifold members attached along opposite edges of the sheets, at least one of the manifold members comprising a sheet that is connected to and follows an edge of one of the pleated water vapor-permeable sheets.

2. A heat and humidity exchanger according to example enumerated embodiment 1 wherein the manifold members comprise sheets of material that are ribbed on at least one side.

3. A heat and humidity exchanger according to example enumerated embodiment 2 wherein the manifold members comprise sheets of material that are ribbed on two opposing sides.

4. A heat and humidity exchanger according to example enumerated embodiment 2 wherein the manifold members are triangular in plan view and the ribs extend from close to the attached edge of the manifold members toward an open edge of the manifold member.

5. A heat and humidity exchanger according to any one of example enumerated embodiments 1 to 4 wherein the manifold members comprise sheets of material having a thickness not exceeding 0.012 inches.

6. A heat and humidity exchanger according to any one of example enumerated embodiments 1 to 5 wherein the manifold members comprise a water vapor-permeable material.

7. A heat and humidity exchanger according to example enumerated embodiment 6 wherein the manifold members are made of the same material as the water vapor-permeable membrane sheets.

8. A heat and humidity exchanger according to any one of example enumerated embodiments 1 to 7 wherein the manifold members are stiffer than the water vapor-permeable membrane sheets.

9. A heat and humidity exchanger according to example enumerated embodiment 8 wherein the manifold members comprise a thermally-conductive material.

10. A heat and humidity exchanger according to any one of example enumerated embodiments 1 to 6 wherein the manifold members comprise a material that is different from a material of the water vapor-permeable sheets.

11. A heat and humidity exchanger according to example enumerated embodiment 10 wherein the manifold members comprise a thermoformed plastic material.

12. A heat and humidity exchanger according to any one of example enumerated embodiments 1 to 11 wherein manifold members comprise a fire-retardant material.

13. A heat and humidity exchanger according to any one of example enumerated embodiments 1 to 12 wherein the manifold members attached to the pleated water vapor-permeable sheets have edges formed to follow the pleats of the pleated sheets and a transition zone wherein the manifold members gradually become flatter with distance from the edges of the manifold members.

14. A heat and humidity exchanger according to any one of example enumerated embodiments 1 to 13 wherein the manifold members comprise a frame extending around periphery of the water vapor-permeable membrane sheet to which the manifold member is attached.

15. A heat and humidity exchanger according to any one of example enumerated embodiments 1 to 14 wherein the pleated water vapor-permeable sheets are glued to the adjacent water vapor-permeable sheets.

16. A heat and humidity exchanger according to example enumerated embodiment 15 wherein the glue is a water-permeable glue.

17. A heat and humidity exchanger according to example enumerated embodiment 15 wherein the core is self-supporting.

18. A heat and humidity exchanger according to any one of example enumerated embodiments 1 to 17 wherein the core is made up of alternating flat water vapor-permeable membrane sheets and pleated water vapor-permeable membrane sheets.

19. A heat and humidity exchanger according to example enumerated embodiment 18 wherein the flat membrane sheets extend between manifold members attached to adjacent pleated sheets to separate adjacent plenums.

20. A heat and humidity exchanger according to example enumerated embodiment 19 wherein the manifold members comprise sheets of material that are ribbed on two opposing sides and the flat water vapor-permeable membrane sheets are supported between ribs of the adjacent manifold members.

21. A heat and humidity exchanger according to any one of example enumerated embodiments 18 to 20 wherein the channels are triangular in cross-section.

22. A heat and humidity exchanger according to example enumerated embodiment 21 wherein the pleated water vapor-permeable sheets have pleat angles of $60°\pm15°$.

23. A heat and humidity exchanger according to example enumerated embodiment 22 wherein the channels have heights of $4.5\pm2.5$ mm.

24. A heat and humidity exchanger according to any one of example enumerated embodiments 1 to 23 wherein the pleated water vapor-permeable sheets are attached to adjacent water vapor-permeable sheets along folds of the pleated water vapor-permeable sheets.

25. A heat and humidity exchanger according to example enumerated embodiment 24 wherein the pleated water vapor-permeable sheets are formed with flattened crests.

26. A heat and humidity exchanger according to any one of example enumerated embodiments 1 to 17 wherein the channels are defined between adjacent pleated water vapor-permeable sheets and crests of the adjacent water vapor-permeable pleated sheets are attached to one another.

27. A heat and humidity exchanger according to one of example enumerated embodiments 1 to 17 or 26 wherein the plurality of channels are quadrilateral in cross-section.

28. A heat and humidity exchanger according to example enumerated embodiment 27 wherein the plurality of channels are square or rectangular in cross-section.

29. A heat and humidity exchanger according to example enumerated embodiment 27 wherein the plurality of channels are diamond-shaped in cross-section.

30. A heat and humidity exchanger according to any one of example enumerated embodiments 1 to 29 comprising a sealant material sealing faces of the core that extend parallel to the channels.

31. A heat and humidity exchanger according to any one of example enumerated embodiments 1 to 29 wherein the water vapor-permeable sheets of the core are sealed to adjacent water vapor-permeable sheets along edges of the sheets extending parallel to the channels.

32. A heat and humidity exchanger according to any one of example enumerated embodiments 1 to 31 wherein the plenums are connected to carry first and second fluid flows through the channels of the core such that the first and second flows are carried in alternating ones of the groups of channels and the first and second flows flow in opposing directions through the core.

33. A heat and humidity exchanger according to any one of example enumerated embodiments 1 to 32 wherein a first group of the plurality of channels extends from a first plenum through the core to a second plenum, a second group of the plurality of channels extends from a third plenum through the core to a fourth plenum, each of the plurality of channels in the first group have walls in common with a plurality of the channels of the second group and each of the plurality of channels in the second group have walls in common with a plurality of the channels of the first group.

34. A heat and humidity exchanger according to any one of example enumerated embodiments 1 to 33 wherein each of the channels comprises a plurality of walls and each of the channel walls is water vapor-permeable.

35. A heat and humidity exchanger according to any one of example enumerated embodiments 1 to 34 wherein for at least a plurality of the channels in a plurality of the groups each of the water vapor-permeable walls is in common with another channel belonging to a different one of the groups of channels.

36. An energy recovery ventilator for a building comprising a heat and humidity exchanger according to any one of example enumerated embodiments 1 to 35.

37. Use of a heat and humidity exchanger according to any one of example enumerated embodiments 1 to 35 for exchanging heat and humidity between a flow of fresh air entering a building and a flow of air exiting the building.

38. A heat and humidity exchanger comprising:
a core comprising a plurality of channels, a first group of the plurality of channels extending from a first plenum through the core to a second plenum, a second group of the plurality of channels extending from a third plenum through the core to a fourth plenum, each of the plurality of channels in the first group having walls in common with a plurality of the channels of the second group and each of the plurality of channels in the second group having walls in common with a plurality of the channels of the first group;
the plurality of channels defined by a plurality of water vapor-permeable membrane sheets, at least one of the water vapor-permeable membrane sheets being pleated, the pleated water vapor-permeable membrane sheet defining a plurality of the walls of each of a plurality of the first group of channels;
wherein the first and fourth plenums are separated at least in part by a manifold sheet that is connected to and follows an edge of the pleated water vapor-permeable membrane sheet.

39. A heat and humidity exchanger according to example enumerated embodiment 38 wherein the second and third plenums are separated at least in part by a second manifold sheet that is connected to and follows an edge of the pleated water vapor-permeable membrane sheet.

40. A heat and humidity exchanger according to example enumerated embodiment 38 or 39 wherein the channels of the first and second groups of channels are straight and parallel to one another.

41. A heat and humidity exchanger according to any one of example enumerated embodiments 38 to 40 wherein the plenums are defined at least in part by manifold members attached to the water vapor-permeable membrane sheets of the core and the manifold members comprise sheets of material that are ribbed on at least one side.

42. A heat and humidity exchanger according to example enumerated embodiment 41 wherein the manifold members comprise sheets of material that are ribbed on two opposing sides.

43. A heat and humidity exchanger according to any of example enumerated embodiments 41 to 42 wherein the manifold members are triangular in plan view and the ribs extend from close to the attached edge of the manifold members toward an open edge of the manifold member.

44. A heat and humidity exchanger according to any one of example enumerated embodiments 41 to 43 wherein, the manifold members provide separating portions that separate adjacent ones of the plenums and the separating portions comprise sheets of material having a thickness not exceeding 0.012 inches.

45. A heat and humidity exchanger according to any one of example enumerated embodiments 41 to 44 wherein the manifold members comprise a water vapor-permeable material.

46. A heat and humidity exchanger according to example enumerated embodiment 45 wherein the manifold members are made of the same material as the water vapor-permeable membrane sheets.

47. A heat and humidity exchanger according to any one of example enumerated embodiments 41 to 46 wherein the manifold members are stiffer than the water vapor-permeable membrane sheets.

48. A heat and humidity exchanger according to example enumerated embodiment 47 wherein the manifold members comprise a thermally-conductive material.

49. A heat and humidity exchanger according to any one of example enumerated embodiments 41 to 45 wherein the manifold members comprise a material that is different from a material of the water vapor-permeable sheets.

50. A heat and humidity exchanger according to any one of example enumerated embodiments 41 to 44 wherein the manifold members comprise a thermoformed plastic material.

51. A heat and humidity exchanger according to any one of example enumerated embodiments 41 to 50 wherein the manifold members comprise a fire-retardant material.

52. A heat and humidity exchanger according to any one of example enumerated embodiments 41 to 51 wherein the manifold members attached to the pleated water vapor-permeable sheets have edges formed to follow the pleats of the pleated sheets and a transition zone wherein the manifold members gradually become flatter with distance from the edges of the manifold members.

53. A heat and humidity exchanger according to any one of example enumerated embodiments 41 to 52 wherein the manifold members comprise a frame extending around periphery of the water vapor-permeable membrane sheet to which the manifold member is attached.

54. A heat and humidity exchanger according to any one of example enumerated embodiments 38 to 53 wherein the pleated water vapor-permeable sheets are glued to the adjacent water vapor-permeable sheets.

55. A heat and humidity exchanger according to example enumerated embodiment 54 wherein the pleated water vapor-permeable sheets are glued to the adjacent water vapor-permeable sheets by a water-permeable glue.

56. A heat and humidity exchanger according to example enumerated embodiment 54 wherein the core is self-supporting.

57. A heat and humidity exchanger according to any one of example enumerated embodiments 38 to 56 wherein the core is made up of alternating flat water vapor-permeable membrane sheets and pleated water vapor-permeable membrane sheets.
58. A heat and humidity exchanger according to example enumerated embodiment 57 wherein the flat membrane sheets extend between manifold members attached to adjacent pleated sheets to separate adjacent plenums.
59. A heat and humidity exchanger according to example enumerated embodiment 58 wherein the manifold members comprise sheets of material that are ribbed on two opposing sides and the flat water vapor-permeable membrane sheets are supported between ribs of the adjacent manifold members.
60. A heat and humidity exchanger according to example enumerated embodiment 57 wherein the channels are triangular in cross-section.
61. A heat and humidity exchanger according to example enumerated embodiment 60 wherein the pleated water vapor-permeable sheets have pleat angles of 60°±15°.
62. A heat and humidity exchanger according to example enumerated embodiment 61 wherein the channels have heights of 4.5±2.5 mm.
63. A heat and humidity exchanger according to any one of example enumerated embodiments 38 to 62 wherein the pleated water vapor-permeable sheets are attached to adjacent water vapor-permeable sheets along folds of the pleats.
64. A heat and humidity exchanger according to example enumerated embodiment 63 wherein the pleated water vapor-permeable sheets are configured with pleats having flattened crests.
65. A heat and humidity exchanger according to any one of example enumerated embodiments 38 to 64 wherein the channels are defined between adjacent pleated water vapor-permeable sheets and crests of the adjacent water vapor-permeable pleated sheets are attached to one another.
66. A heat and humidity exchanger according to example enumerated embodiment 38 wherein the plurality of channels are quadrilateral in cross-section.
67. A heat and humidity exchanger according to example enumerated embodiment 66 wherein the plurality of channels are square or rectangular in cross-section.
68. A heat and humidity exchanger according to example enumerated embodiment 66 wherein the plurality of channels are diamond-shaped in cross-section.
69. A heat and humidity exchanger according to any one of example enumerated embodiments 38 to 68 comprising a sealant material sealing faces of the core that extend parallel to the channels.
70. A heat and humidity exchanger according to any one of example enumerated embodiments 38 to 68 wherein the water vapor-permeable sheets of the core are sealed to adjacent water vapor-permeable sheets of the core along edges of the sheets extending parallel to the channels.
71. A heat and humidity exchanger according to any one of example enumerated embodiments 38 to 68 wherein the plenums are connected to carry first and second fluid flows through the channels of the core such that the channels carrying the first flow are separated from channels carrying the second flow by the water vapor permeable membrane sheets of the core.
72. A heat and humidity exchanger according to any one of example enumerated embodiments 38 to 71 wherein a first group of the plurality of channels extends from a first plenum through the core to a second plenum, a second group of the plurality of channels extends from a third plenum through the core to a fourth plenum, each of the plurality of channels in the first group have walls in common with a plurality of the channels of the second group and each of the plurality of channels in the second group have walls in common with a plurality of the channels of the first group.
73. A heat and humidity exchanger according to any one of example enumerated embodiments 38 to 71 wherein each of the channels comprises a plurality of walls and each of the channel walls is water vapor-permeable.
74. A heat and humidity exchanger according to any one of example enumerated embodiments 38 to 71 wherein the core is formed from a plurality of layers, and each of the plurality of layers is self-supporting.
75. A heat and humidity exchanger according to example enumerated embodiment 74 wherein each of the plurality of layers comprises one of the water vapor permeable membrane sheets attached to one or more manifold members.
76. A heat and humidity exchanger according to example enumerated embodiment 75 wherein each of the plurality of layers comprises a pleated water vapor permeable membrane sheets attached along folds to another water vapor permeable membrane sheet.
77. An energy recovery ventilator for a building comprising a heat and humidity exchanger according to any one of example enumerated embodiments 38 to 76.
78. Use of a heat and humidity exchanger according to any one of example enumerated embodiments 38 to 76 for exchanging heat and humidity between a flow of fresh air entering a building and a flow of air exiting the building.
79. A heat and humidity exchanger comprising:
    a core comprising a plurality of channels each having a triangular cross-section, a first group of the plurality of channels extending from a first plenum through the core to a second plenum, a second group of the plurality of channels extending from a third plenum through the core to a fourth plenum, each of the plurality of channels in the first group having walls in common with a plurality of the channels of the second group and each of the plurality of channels in the second group having walls in common with a plurality of the channels of the first group, each of the common walls being water vapor-permeable.
80. A heat and humidity exchanger according to example enumerated embodiment 79 wherein the channels of the first and second groups of channels are straight and parallel to one another.
81. A heat and humidity exchanger according to any one of example enumerated embodiments 79 or 80 wherein the core comprises a plurality of vapor-permeable membrane stacked vapor-permeable membrane sheets and the plenums are defined at least in part by manifold members attached to the water vapor-permeable membrane sheets of the core.
82. A heat and humidity exchanger according to example enumerated embodiment 81 wherein the manifold members comprise sheets of material that are ribbed on at least one side.
83. A heat and humidity exchanger according to example enumerated embodiment 82 wherein the manifold members comprise sheets of material that are ribbed on two opposing sides.
84. A heat and humidity exchanger according to any of example enumerated embodiments 82 to 83 wherein the manifold members are triangular in plan view and the ribs extend from close to the attached edge of the manifold members toward an open edge of the manifold member.

85. A heat and humidity exchanger according to any of example enumerated embodiments 82 to 84 wherein the manifold members are each connected to the core along a first edge, have an up-turned wall along a second edge and a down-turned wall along a third edge such that, when stacked together the manifold members form a stack of plenums that open alternately to sides corresponding to the first and second edges 86. A heat and humidity exchanger according to any one of example enumerated embodiments 81 to 85 wherein, the manifold members provide separating portions that separate adjacent ones of the plenums and the separating portions comprise sheets of material having a thickness not exceeding 0.012 inches.

87. A heat and humidity exchanger according to any one of example enumerated embodiments 81 to 86 wherein the manifold members comprise a water vapor-permeable material.

88. A heat and humidity exchanger according to any one of example enumerated embodiments 81 to 86 wherein the manifold members are made of the same material as the water vapor-permeable membrane sheets.

89. A heat and humidity exchanger according to any one of example enumerated embodiments 81 to 88 wherein the manifold members are stiffer than the water vapor-permeable membrane sheets.

90. A heat and humidity exchanger according to any one of example enumerated embodiments 81 to 86 wherein the manifold members comprise a material that is different from a material of the water vapor-permeable sheets.

91. A heat and humidity exchanger according to example enumerated embodiment 90 wherein the manifold members comprise a thermoformed plastic material.

92. A heat and humidity exchanger according to any one of example enumerated embodiments 81 to 91 wherein the manifold members comprise a fire-retardant material.

93. A heat and humidity exchanger according to any one of example enumerated embodiments 81 to 92 wherein the core comprises a plurality of pleated water vapor permeable membrane sheets and manifold members attached to the pleated water vapor-permeable sheets have edges formed to follow the pleats of the pleated sheets and a transition zone wherein the manifold members gradually become flatter with distance from the edges of the manifold members.

94. A heat and humidity exchanger according to any one of example enumerated embodiments 81 to 93 wherein the manifold members comprise a frame extending around periphery of the water vapor-permeable membrane sheet to which the manifold member is attached.

95. A heat and humidity exchanger according to example enumerated embodiment 93 wherein the pleated water vapor-permeable sheets are glued to the adjacent water vapor-permeable sheets.

96. A heat and humidity exchanger according to example enumerated embodiment 95 wherein the pleated water vapor-permeable sheets are glued to the adjacent water vapor-permeable sheets by a water-permeable glue.

97. A heat and humidity exchanger according to any one of example enumerated embodiments 79 to 95 wherein the core is self-supporting.

98. A heat and humidity exchanger according to example enumerated embodiment 97 wherein the core is made up of alternating flat water vapor-permeable membrane sheets and pleated water vapor-permeable membrane sheets.

99. A heat and humidity exchanger according to example enumerated embodiment 98 wherein the flat membrane sheets extend between manifold members attached to adjacent pleated sheets to separate adjacent plenums.

100. A heat and humidity exchanger according to example enumerated embodiment 99 wherein the manifold members comprise sheets of material that are ribbed on two opposing sides and the flat water vapor-permeable membrane sheets are supported between ribs of the adjacent manifold members.

101. A heat and humidity exchanger according to any one of example enumerated embodiments 79 to 100 wherein the channels have heights of 4.5±2.5 mm.

102. An energy recovery ventilator for a building comprising a heat and humidity exchanger according to any one of example enumerated embodiments 79 to 101.

103. Use of a heat and humidity exchanger according to any one of example enumerated embodiments 79 to 101 for exchanging heat and humidity between a flow of fresh air entering a building and a flow of air exiting the building.

104. A heat and water vapor exchanger comprising:
  a core structure comprising a plurality of layered water vapor permeable sheets attached together to form a self-supporting structure, a plurality of the layered water vapor permeable sheets being pleated such that triangular channels extend through the core;
  a manifold structure comprising manifold members attached along edges of the vapor permeable membrane sheets of the core, the manifold members forming stacked plenums such that channels extending through the core between different pairs of adjacent ones of the water vapor permeable membrane sheets are in fluid communication with different ones of the plenums.

105. A heat and water vapor exchanger according to example enumerated embodiment 104 wherein the core comprises a stack of pleated sheets of water vapor permeable membrane alternating with flat sheets of water vapor permeable membrane.

106. A heat and water vapor exchanger according to example enumerated embodiment 104 or 105 wherein the manifold members are of a material different from that of the water vapor permeable membrane sheets.

INTERPRETATION OF TERMS

Unless the context clearly requires otherwise, throughout the description and the claims:
  "comprise," "comprising," and the like are to be construed in an inclusive sense, as opposed to an exclusive or exhaustive sense; that is to say, in the sense of "including, but not limited to".
  "connected," "coupled," or any variant thereof, means any connection or coupling, either direct or indirect, between two or more elements; the coupling or connection between the elements can be physical, logical, or a combination thereof.
  "herein," "above," "below," and words of similar import, when used to describe this specification shall refer to this specification as a whole and not to any particular portions of this specification.
  "or," in reference to a list of two or more items, covers all of the following interpretations of the word: any of the items in the list, all of the items in the list, and any combination of the items in the list.

the singular forms "a," "an," and "the" also include the meaning of any appropriate plural forms.

Words that indicate directions such as "vertical," "transverse," "horizontal," "upward," "downward," "forward," "backward," "inward," "outward," "vertical," "transverse," "left," "right," "front," "back"," "top," "bottom," "below," "above," "under," and the like, used in this description and any accompanying claims (where present) depend on the specific orientation of the apparatus described and illustrated. The subject matter described herein may assume various alternative orientations. Accordingly, these directional terms are not strictly defined and should not be interpreted narrowly.

Where a component (e.g. a core, structure, plenum, fan, duct, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

Specific examples of systems, methods and apparatus have been described herein for purposes of illustration. These are only examples. The technology provided herein can be applied to systems other than the example systems described above. Many alterations, modifications, additions, omissions and permutations are possible within the practice of this invention. This invention includes variations on described embodiments that would be apparent to the skilled addressee, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

It is therefore intended that the following appended claims and claims hereafter introduced are interpreted to include all such modifications, permutations, additions, omissions and sub-combinations as may reasonably be inferred. The scope of the claims should not be limited by the preferred embodiments set forth in the examples, but should be given the broadest interpretation consistent with the description as a whole.

What is claimed is:

1. A method of making a heat and humidity exchanger core, the method comprising:
   molding each of a plurality of water vapor-permeable membrane sheets, the molding deforming the sheets to form a plurality of out-of-plane features in a central section, and a plurality of out-of-plane features in first and second manifold regions on opposing sides of the central section;
   stacking the plurality of membrane sheets, and joining adjacent membrane sheets together, to provide:
   a plurality of channels between each adjacent pair of the membrane sheets, the channels defined by the out-of-plane features in the central section of adjacent ones of the membrane sheets, and
   first and second plenums between each adjacent pair of the membrane sheets, the first plenum defined at least in part by the first manifold regions of adjacent ones of the membrane sheets, and the second plenum defined at least in part by the second manifold regions of adjacent ones of the membrane sheets, the plurality of channels fluidly connecting the first plenum to the second plenum;
   wherein the water vapor-permeable membrane sheets are made from a composite material comprising a formable support layer and a water vapor-permeable coating, and a height of the channels is at least 2 mm.

2. The method of claim 1 wherein molding by deforming each of a plurality of water vapor-permeable membrane sheets comprises thermoforming, compression molding or vacuum forming each of the plurality of water vapor-permeable membrane sheets to form the plurality of out-of-plane features in the central section, and the plurality of out-of-plane features in the first and second manifold regions.

3. The method of claim 1 wherein molding by deforming each of a plurality of water vapor-permeable membrane sheets to form a plurality of out-of-plane features in a central section comprises: molding a plurality of water vapor-permeable membrane sheets to form a plurality of parallel pleats or grooves in the central section of each membrane sheet.

4. A method of making a heat and humidity exchanger core, the method comprising:
   making molded membrane sheets by molding each of a plurality of water vapor-permeable membrane sheets, the molding deforming the sheets to form a plurality of out-of-plane features in a central section, and a plurality of out-of-plane features in first and second manifold regions of each membrane sheet,
   stacking the molded vapor-permeable membrane sheets alternately with co-extensive flat vapor-permeable membrane sheets, and joining adjacent membrane sheets together, to provide:
   a plurality of channels between each adjacent pair of the membrane sheets, the channels defined by the out-of-plane features in the central section of a molded membrane sheet and the adjacent flat membrane sheet of each adjacent pair of the membrane sheets; and
   first and second plenums between each adjacent pair of the membrane sheets, the first plenum defined at least in part by the first manifold region of a molded membrane sheet and the adjacent flat membrane sheet of each adjacent pair of the membrane sheets, and the second plenum defined at least in part by the second manifold region of the molded membrane sheet and the adjacent flat membrane sheet of each adjacent pair of the membrane sheets, the plurality of channels fluidly connecting the first plenum to the second plenum;
   wherein the molded water vapor-permeable membrane sheets are made from a composite material comprising a formable support layer and a water vapor permeable coating, and a height of the channels is at least 2 mm.

5. The method of claim 4 wherein molding by deforming each of a plurality of water vapor-permeable membrane sheets to form a plurality of out-of-plane features in first and second manifold regions comprises: molding a plurality of water vapor-permeable membrane sheets to form a plurality of ribs in said first and second manifold regions of each membrane sheet and wherein the flat water vapor-permeable membrane sheets are supported between ribs of adjacent molded membrane sheets in the first and second manifold regions.

* * * * *